(12) United States Patent
Angel et al.

(10) Patent No.: US 11,898,451 B2
(45) Date of Patent: Feb. 13, 2024

(54) COMPACT AXIAL TURBINE FOR HIGH DENSITY WORKING FLUID

(71) Applicants: Industrom Power LLC, Houston, TX (US); Paul Angel, Huffman, TX (US)

(72) Inventors: Paul Angel, Huffman, TX (US); Joseph Harris, Houston, TX (US)

(73) Assignee: Industrom Power LLC, Houston, TX (US)

( * ) Notice: Subject to any disclaimer, the term of this patent is extended or adjusted under 35 U.S.C. 154(b) by 125 days.

(21) Appl. No.: 17/430,390

(22) PCT Filed: Mar. 5, 2020

(86) PCT No.: PCT/US2020/021260
§ 371 (c)(1),
(2) Date: Aug. 12, 2021

(87) PCT Pub. No.: WO2020/181134
PCT Pub. Date: Sep. 10, 2020

(65) Prior Publication Data
US 2022/0145768 A1 May 12, 2022

Related U.S. Application Data

(60) Provisional application No. 62/814,821, filed on Mar. 6, 2019.

(51) Int. Cl.
*F01D 15/12* (2006.01)
*F01D 5/10* (2006.01)
(52) U.S. Cl.
CPC ............... *F01D 15/12* (2013.01); *F01D 5/10* (2013.01); *F05D 2260/4031* (2013.01)

(58) Field of Classification Search
CPC . F01D 15/12; F01D 5/10; F01D 5/027; F01D 5/06; F01D 25/265; F01D 5/066;
(Continued)

(56) References Cited

U.S. PATENT DOCUMENTS

| 2,151,699 A | 3/1939 | Heiner |
| 2,282,894 A | 5/1942 | Sheldon |

(Continued)

FOREIGN PATENT DOCUMENTS

| EP | 3447244 A1 | 2/2019 |
| JP | 2012172587 A | 9/2012 |

OTHER PUBLICATIONS

Supercritical CO2 and the flexible future of fossil fuels (2018). Modern Power Systems. [5 pages].
(Continued)

*Primary Examiner* — Hoang M Nguyen
(74) *Attorney, Agent, or Firm* — Michael S. McCoy; Amatong McCoy LLC

(57) ABSTRACT

A compact axial turbine configured to operate with high density working fluid is described. The turbine comprises an axial majority cantilevered turbomachinery shaft. Rotor assemblies and nozzle spacers communicate torque through turbine shaft splines, allowing them to be slid off the shaft for quick replacement in the field. The compact axial turbine houses turbomachinery within a separable inner casing encircled by a cartridge sleeve, thereby forming a cartridge which can itself be removed as a single component.

20 Claims, 11 Drawing Sheets

(58) Field of Classification Search
CPC .... F01D 5/34; F01D 15/10; F05D 2260/4031; F05D 2210/13; F05D 2220/76; F05D 2230/61; F05D 2240/61; F05D 2260/36; F02C 1/04; F02C 1/105; Y02T 50/60; F04D 25/163; F04D 25/045

See application file for complete search history.

(56) References Cited

U.S. PATENT DOCUMENTS

| | | | |
|---|---|---|---|
| 2,633,705 A | 4/1953 | Hawkins | |
| 4,557,664 A | 12/1985 | Tuttle et al. | |
| 4,664,599 A | 5/1987 | Robbins et al. | |
| 4,704,861 A * | 11/1987 | Mowill | F04D 29/622 60/726 |
| 5,960,625 A | 10/1999 | Zdvorak | |
| 6,230,480 B1 | 5/2001 | Rollins, III | |
| 6,751,959 B1 | 6/2004 | McClanahan et al. | |
| 8,459,029 B2 | 6/2013 | Lehar | |
| 8,490,397 B2 | 7/2013 | Lehar | |
| 8,596,075 B2 | 12/2013 | Allam et al. | |
| 8,613,195 B2 | 12/2013 | Held et al. | |
| 8,616,001 B2 | 12/2013 | Held et al. | |
| 8,616,323 B1 | 12/2013 | Gurin | |
| 8,646,272 B2 | 2/2014 | Baik et al. | |
| 8,783,034 B2 | 7/2014 | Held | |
| 8,794,002 B2 | 8/2014 | Held et al. | |
| 8,813,497 B2 | 8/2014 | Hart et al. | |
| 8,857,186 B2 | 10/2014 | Held | |
| 8,869,531 B2 | 10/2014 | Held | |
| 8,966,901 B2 | 3/2015 | Held et al. | |
| 9,062,898 B2 | 6/2015 | Held et al. | |
| 9,083,212 B2 | 7/2015 | Fairman et al. | |
| 9,091,278 B2 | 7/2015 | Vermeersch | |
| 9,115,605 B2 | 8/2015 | Held et al. | |
| 9,118,226 B2 | 8/2015 | Kacludis et al. | |
| 9,249,691 B2 | 2/2016 | Ast et al. | |
| 9,249,728 B2 | 2/2016 | Lim et al. | |
| 9,284,855 B2 | 3/2016 | Held et al. | |
| 9,341,084 B2 | 5/2016 | Xie et al. | |
| 9,359,919 B1 | 6/2016 | Berry | |
| 9,388,817 B1 | 7/2016 | Wright et al. | |
| 9,458,738 B2 | 10/2016 | Held et al. | |
| 9,476,428 B2 | 10/2016 | Agrawal et al. | |
| 9,574,570 B2 | 2/2017 | Lillis | |
| 9,638,065 B2 | 5/2017 | Vermeersch et al. | |
| 9,677,432 B2 | 6/2017 | Kang et al. | |
| 9,752,460 B2 | 9/2017 | Bowan | |
| 9,752,672 B2 | 9/2017 | Aschenbruck et al. | |
| 9,797,314 B2 | 10/2017 | Hillel et al. | |
| 9,845,807 B2 | 12/2017 | Takeda et al. | |
| 9,863,282 B2 | 1/2018 | Hart et al. | |
| 10,060,300 B2 | 8/2018 | Bastnagel et al. | |
| 10,101,092 B2 | 10/2018 | Stapp et al. | |
| 2004/0040307 A1* | 3/2004 | Dimov | F23R 3/346 60/747 |
| 2005/0284150 A1* | 12/2005 | Dittmar | F01D 15/10 60/788 |
| 2006/0130488 A1 | 6/2006 | Suciu et al. | |
| 2012/0107094 A1 | 5/2012 | Lillis | |
| 2012/0131921 A1 | 5/2012 | Held | |
| 2012/0306206 A1 | 12/2012 | Agrawal et al. | |
| 2013/0001948 A1 | 1/2013 | Lim et al. | |
| 2013/0033037 A1 | 2/2013 | Held et al. | |
| 2013/0033044 A1 | 2/2013 | Wright et al. | |
| 2013/0111989 A1 | 5/2013 | Casadio et al. | |
| 2013/0152576 A1 | 6/2013 | Mavuri et al. | |
| 2015/0037136 A1 | 2/2015 | Fairman et al. | |
| 2015/0139776 A1 | 5/2015 | Takeda et al. | |
| 2015/0322811 A1 | 11/2015 | Fairman et al. | |
| 2017/0234266 A1 | 8/2017 | Hwang et al. | |
| 2019/0024540 A1 | 1/2019 | Cha | |
| 2019/0162083 A1 | 5/2019 | Wygant | |

OTHER PUBLICATIONS

Dostal, V. et al.(2004). "A Supercritical Carbon Dioxide Cycle for Next Generation Nuclear Reactors". Advanced Nuclear Power Technology Program. [326 pages].

EChogen Power Systems (2017). EchogenEPS 100 Heat Recovery System—Marketing Brochure. OH. [2 pages].

Eisemann, Kevin M., & Fuller, Robert L. (2011). Supercritical CO2 Brayton Cycle Design and System Start-Up Options. Boulder, Colorado.[7 pages].

Held, Timothy J. (2015) "Supercritical CO2 Cycles for Gas Turbine Combined Cycle Power Plants" Power Gen International. Nevada. [20 pages].

Hoopes, Kevin, et al. (2018). "Advanced Gas Turbine and sCO2 Combined Cycle Power System". UTSR Meeting. [18 pages].

Huck, Pierre, et al. (2016). "Performance comparison of supercritical CO2 versus steam bottoming cycles for gas turbine combined cycle applications." The 5th International Symposium—Supercritical CO2 Power Cycles. Texas [14 pages].

International Preliminary Report on Patentability dated Sep. 16, 2021 (issued in PCT Application No. PCT/US20/21265) [7 Pages].

International Search Report and Written Opinion dated Aug. 19, 2020 (issued in PCT Application No. PCT/US20/21265) [10 Pages].

Moore, Jeff (2018). "Development of a High-Efficiency Hot Gas Turbo-expander and Low-Cost Heat Exchangers for Optimized CSP Supercritical CO2 Operation." Southwest Research Institute. San Antonio, TX. [181 pages].

Moroz, Leonid, et al. (2015). "Evaluation of Gas Turbine Exhaust Heat Recovery Utilizing Composite Supercritical CO2 Cycle". Proceedings of International Gas Turbine Congress 2015 Tokyo. p. 109-115.

Murphy, Caitlin, et al. (2019). "The Potential Role of Concentrating Solar Power within the Context of DOE's 2030 Solar Cost Targets". National Renewable Energy Laboratory. CO. [137 pages].

Partial European Search Report dated Nov. 18, 2022 (issued in EP Application No. 20 767 439.1) [12 pages].

Robb, Drew. (2012). Supercritical CO2—The Next Big Step ?. MJH Life Science and Turbomachinery Magazine. [8 pages].

U.S. Department of Energy (2012). "SunShot Vision Study" Report. [320 pages].

Wright, Steven A. et al. (2011). "Supercritical CO2 Power Cycle Development Summary at Sandia National Laboratories". Sandia National Laboratories Advanced Nuclear Technology. [29 pages].

Wright, Steven A., et al. (2016) "Thermo-Economic Analysis of Four sCO2 Waste Heat Recovery Power Systems". WA. [16 pages].

European Supplemental Search Report received in European Application No. EP 20 767 206.4 (dated Mar. 3, 2023) [15 pages].

Engineering ToolBox, (2003). Critical Temperatures and Pressures for some Common Substances. [10 pages].

International Preliminary Report on Patentability, dated Sep. 16, 2021, issued in PCT Application No. PCT/US20/21260. [9 pages].

International Search Report and Written Opinion dated Oct. 14, 2020, issued in PCT Application No. PCT/US20/21260. [11 pages].

* cited by examiner

COMPACT AXIAL TURBINE FOR HIGH DENSITY WORKING FLUID

CROSS-REFERENCE TO RELATED APPLICATIONS

The present application is a National Stage Entry of PCT Application No. PCT/US2020/021260, filed on Mar. 5, 2020 (pending), which claims priority to U.S. provisional application Ser. No. 62/814,821, which was filed on Mar. 6, 2019, and entitled "Compact Axial Turbine for High Density Working Fluid", the entireties of which are incorporated herein by reference.

TECHNICAL FIELD

This invention generally relates to systems and methods for axial turbines for generation of power, such as electricity production or pump or propeller driving or lifting a weight, through the use of a circulating fluid such as supercritical carbon dioxide.

BACKGROUND OF THE INVENTION

Many methods and systems exist for generating electricity by the transfer and conversion of heat into mechanical or electrical energy. Systems where the hot source fluid is not recycled, but rather, is discarded or removed by external means (known as waste heat sources) typically have a higher cost per unit of power produced (referred to in the industry as specific cost) and a larger system volume per unit power produced (referred to as specific volume). They also suffer from a lengthy time of response to initial thermal input into the system.

Conventional waste heat recovery systems use a Rankine power cycle with water or an organic hydrocarbon as the working fluids. These conventional systems usually need a waste heat source with temperatures in the range of 500 to 900 degrees C. The system equipment is large-scale, stationary, and costly. Working fluids for these systems require chemical treatment for water, or use organic hydrocarbon fluids, such as iso-butane, that are not environmentally friendly. It also requires a significant amount of time to start a conventional heat recovery system—usually 60 minutes, or more.

Alternative working fluid systems, like supercritical carbon dioxide ($sCO_2$), reduce some of the aforementioned detrimental effects because higher density working fluid systems are characterized by shorter response time to changes in input due to the fluid not boiling or changing from a liquid to gas state. In addition, opportunities are presented for smaller equipment size because the high-density working fluid transfers thermal energy to useful work more quickly than an air or steam system of comparable power.

An added benefit of high-density working fluid systems, such as $sCO_2$ systems, is that they are able to achieve higher power ratings with turbines of smaller diameter. Miniaturization of mechanical devices, however, is often plagued by fabrication and maintenance issues. There exists a need, therefore, for an alternative working fluid, small-diameter axial turbine having improvements that result in easier, faster, and/or lower cost fabrication. Likewise, a need exists for a device of that nature that can be maintained or repaired more easily, including when the device is installed at stationary gas-fueled power plants, mobile power units, offshore platforms, floating production storage and offloading vessels, industrial plants, marine propulsion units, solar power plants, nuclear power plants, pumped thermal electricity storage, and for geothermal power plants. A need also exists for a compact axial turbine that can transmit high power and high torque through a compact device.

Disclosed herein is a compact axial turbine the design of which seeks to be more affordable, flexible in its ability to be easily maintained and repaired, faster in its ability to come to an operational state, smaller and more mobile, and more environmentally friendly to use.

BRIEF SUMMARY OF THE INVENTION

According to one aspect of the present disclosure, there are provided methods and apparatus to improve high-density working fluid turbine design with the benefit of reducing turbine size, simplifying fabrication, improving mobility, and lowering maintenance and repair costs and time, among other benefits.

The present disclosure provides a system for more efficient and compact turbines used with a high-pressure/high-density working fluid, such as, for example, supercritical fluids with densities at the turbine inlet of 100 kg/m3 or greater. The turbines described herein would be well suited, for example, within a waste heat recovery system or a geothermal power system. Turbines of the designs described herein employ several features that allow for increased power generation capabilities in turbines of smaller size, such as between 10 and 50 megawatts of net power. Fabrication, maintenance, repair, and upgradeability times are decreased, as are costs.

According to one aspect of the present disclosure, there is provided a compact axial turbine comprising a turbomachinery shaft, wherein an axial majority of the turbomachinery shaft is cantilevered. In one embodiment, the turbine further comprises one or more rotor assembly comprising a plurality of torque carrying splines. The turbomachinery shaft further comprises a plurality of torque carrying splines configured to mesh with the splines of the one or more rotor assembly. In yet another embodiment, the turbine comprises one or more nozzle spacer, wherein the one or more nozzle spacer comprises a plurality of torque carrying splines configured to mesh with the cog or tooth splines of the turbomachinery shaft. According to one embodiment, there is presented a compact axial turbine comprising two or more rotor assemblies having a plurality of torque carrying splines, and a turbomachinery shaft, wherein the turbomachinery shaft further comprises a plurality of torque carrying splines configured to mesh with the torque carrying splines of the two or more rotor assemblies.

The compact axial turbine designs described herein employ integrated designs not used conventional size turbines, which eliminate fasteners and retainers normally used, for example, between the disk and blade attachment. This reduces complexity, lowers weight, improves mobility, and allows for reduced diameter size of the turbine. In one embodiment, the turbine comprises an outer casing having and inner and outer diameter, wherein the inner diameter of the outer casing at its largest part is 14 inches or less. In one embodiment, it is 11 inches or less. And in another embodiment, it is 18 inches or less. With respect to power output, it is disclosed in one embodiment the turbine having an inner diameter of the outer casing at its largest part as 14 inches or less with a net power output of greater than 10 megawatts. In one embodiment, the turbine has a power density of greater than 5 kilowatts per cubic inch.

According to one aspect of the present disclosure, the turbine further comprising one or more rotor assembly, wherein the one or more rotor assembly comprises integrally bladed rotors. In still another embodiment, the turbine comprises an output shaft, having a plurality of torque carrying splines disposed on a radially inward or outward surface, a torque carrier tube having a plurality of torque carrying splines disposed on a radially inward or outward surface, wherein a portion of splines of the output shaft mesh with at least a portion splines of the torque carrier tube, such that torque may be conveyed between the two.

The cantilever designs disclosed herein ease the fabrication and maintenance of the turbine. According to one embodiment, certain turbomachinery components are contained within a cartridge, the cartridge able to be removed from the turbine casing. In an embodiment, the torque carrier tube is axially bolted to the output shaft. Removal of this bolt allows the cartridge to slide out of the casing.

Turbine designs disclosed herein are configured to operate with certain types of working fluids, which allow for higher power generation in turbines of smaller size. According to one embodiment, there is provided at turbine configured to operate with working fluid having critical temperatures between 15 degrees Celsius and 150 degrees Celsius. In one embodiment, the turbine is configured to operate with working fluid that is supercritical carbon dioxide.

In one embodiment of the present disclosure, there is provided a compact axial turbine comprising turbomachinery disposed in an inner casing, the inner casing being separable along the longitudinal axis of the turbine into two or more segments, and a turbine cartridge sleeve surrounding an axial majority of said inner casing, wherein said cartridge sleeve holds together the two or more segments of the inner casing. In one embodiment, the turbine further comprises a torque carrier tube, wherein an axial majority of said torque carrier tube is cantilevered. In yet another embodiment, the turbine further comprises an output shaft, wherein said cantilevered torque carrier tube is bolted to the output shaft with a single bolt.

In one embodiment, the turbine comprises an outer casing having and inner and outer diameter, wherein the inner diameter of the outer casing at its largest part is 18 inches or less. In one embodiment of the turbine, the turbomachinery, inner casing, and, torque carrier tube, and cartridge sleeve are configured to be removed from the turbine as a single component. In another embodiment of the turbine, it further comprises a flange attached to the torque carrier tube, wherein the flange comprises a plurality of balance weight attachment receptacles. In yet another, it comprises a vibration sensor. In another embodiment, the turbine comprises a rotor assembly, wherein the rotor assembly is axially restrained by the output shaft. In another embodiment, the turbine comprises a rotor assembly that is restrained by the flange.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings. These drawings are used to illustrate only typical embodiments of this invention and are not to be considered limiting of its scope, for the invention may admit to other equally effective embodiments. The figures are not necessarily to scale and certain features and certain views of the figures may be shown exaggerated in scale or in schematic in the interest of clarity and conciseness. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The following descriptions are for the exemplary embodiments shown in the respective figures.

DETAILED DESCRIPTION OF THE INVENTION

Figure 1:
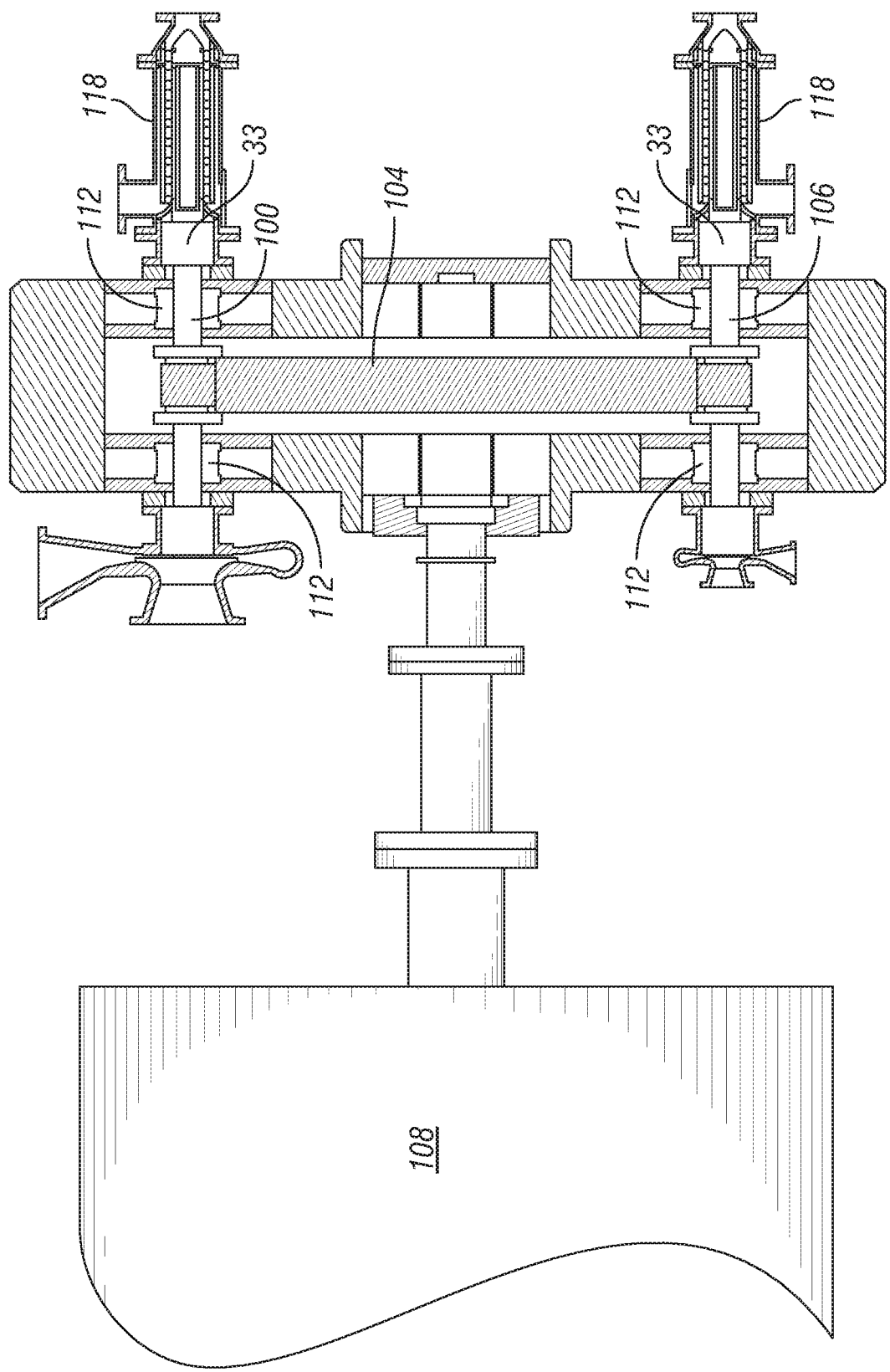
FIG. 1: Plan view of the rotating machinery for one possible waste heat recovery system showing locations of the axial turbines.

As used herein, "a" and "an" means one or more than one unless otherwise stated. Fasteners known in the art of turbine design include machine bolts, nuts, nut-plates, screws, pins, clips, clamps, retaining wire and equivalents. When fasteners are referenced herein, unless specified otherwise, it should be understood that equivalents may be employed and are considered in the present disclosure.

Certain components referenced in the drawings herein are repeated within disclosed embodiments. For example, an exemplary embodiment of the present disclosure includes multiple rotors and nozzles. It should be understood that, unless otherwise specified, the description of one repeatable component (including with a particular reference number) applies generally to the rest.

The invention described herein includes integrally bladed turbine disks known as "blisks." In particular, it relates to the manner in which a single or plurality of turbine blisks may be combined to form a compact turbine assembly and joined to an output shaft. The term blisk is a contraction of the two words "bladed disk" and is used in the field of gas turbine engines to refer to a unified assembly of a turbine disk together with a circumferential array of turbine blades. The plurality of blades may be connected to an outer circumferential ring or shroud. This outer shroud may be continuous or segmented. The turbine blisk may be used in the case either where the whole assembly has been machined from a single piece of metal or where the supporting disk and the blades have been irreversibly joined, for example by forging, casting, welding, brazing, machining, powder metal hot isometric bonding, or additive manufacturing processes. The turbine blisk may be manufactured from standard alloy metals, superalloy metals, powdered metals, ceramic materials, composite materials, or a combination of these or other materials.

The present disclosure provides a system for more efficient and compact axial turbines, using high-pressure/high-density working fluid, such as, for example, supercritical fluids with densities at the turbine inlet of 100 kg/m3 or greater. The turbines described herein would be well suited, for example, within a waste heat recovery system, a geothermal power system, pumped thermal electricity storage, or other power generation system. The exemplary embodiment on an overall power generation system shown in FIG. 1 is a cross section view of rotating machinery having two compact axial turbine mechanisms 118, where one turbine 118 may be a primary turbine and the other a cascade turbine, both connected to individual pinion shafts 100, 106 through shaft seal assembly 33. The pinion shafts 100, 106 rotationally interact with generator 108 through bearings 112 by way of bull gear 104. Shaft seal assembly 33 and a bearing 112 are mounted inboard (drive-end) of the compact axial turbine 118 such that shaft seals and bearings are not located on the working fluid inlet end (non-drive end) thereby reducing thermal effects experienced by these components. The compact axial turbines also drive compressors or other equipment through the pinion shafts 100 and 106.

Figure 13:
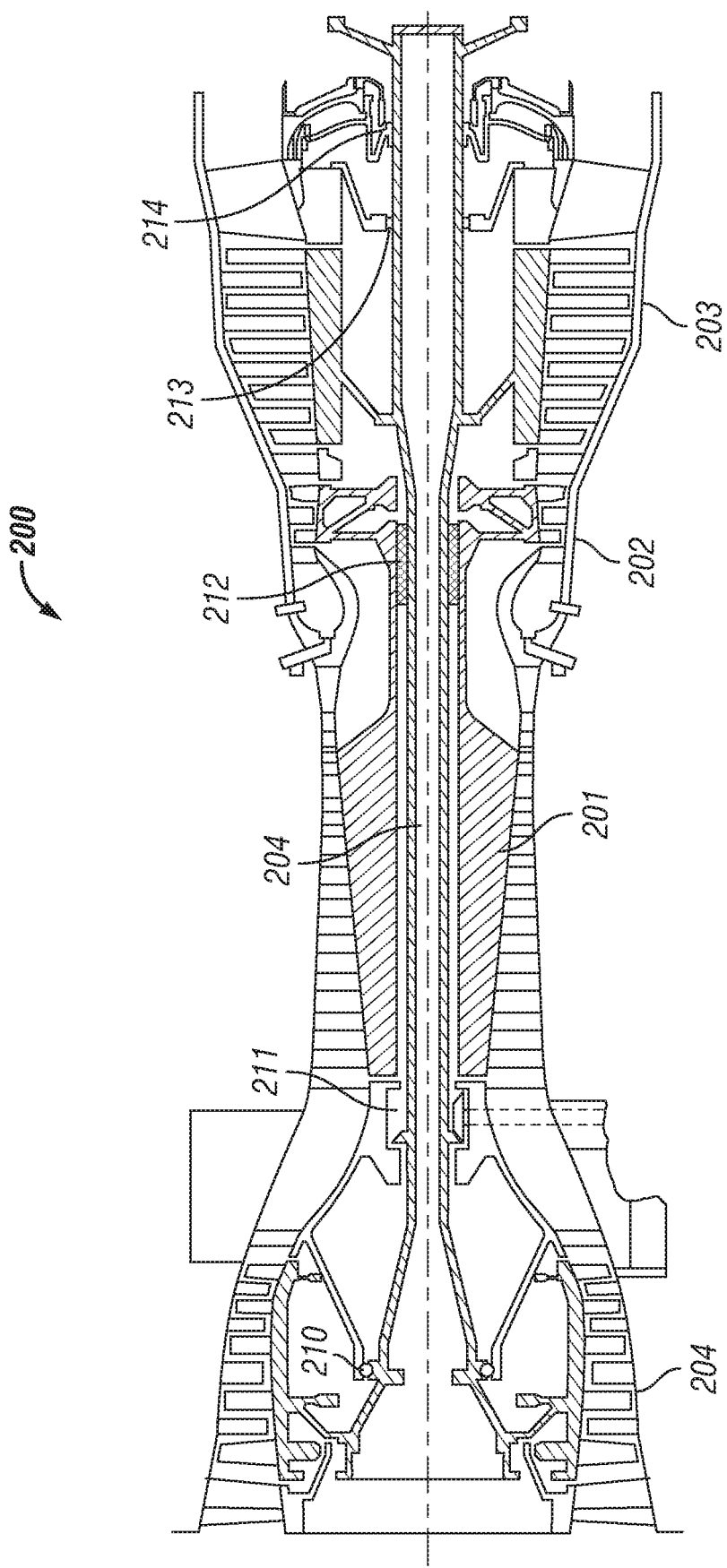
FIG. 13: Illustration of conventional turbine assembly.

Conventional power generation assemblies employing turbines present a number of drawbacks. FIG. 13 depicts a conventional gas turbine engine assembly 200, with working fluid moving from left to right in the figure. Working fluid progresses through turbomachinery (used herein to mean working components of a turbine engine assembly having contact with working fluid, such as nozzles, rotor blades, shafts, etc.). It is first compressed in lower pressure compressor 204 as it encounters several stages of compressor blades. Working fluid is further compressed as it moves through compressor rotor stages in high pressure compressor 201. Upon sufficient compression, working fluid enters a combustor that adds energy to the compressed working fluid. For two-stage turbines such as the one shown in FIG. 13, the higher energy working fluid then encounters high pressure turbine 202 and low-pressure turbine 203, both of which trade energy for torque.

Conventional turbine 200 includes a single high length shaft 204 about which all of the compressor stages and turbine stages rotate. This necessitates periodic bearing structures along the length of shaft 204. FIG. 13 shows this turbine as containing rotor ball bearing 210 within low pressure compressor 204, roller bearing(s) 211 in between low pressure compressor 204 and high pressure compressor 201, ball and roller bearing(s) 212 just before high pressure turbine 202, and roller bearings 213 and 214 after low pressure turbine 203. It is understood that different types of bearing may be used. Placement may change as well, according to the design of the conventional turbine.

Placement of bearings within the turbomachinery of a turbine, however, presents certain drawbacks. The bearings themselves encounter the high temperatures seen within turbine turbomachinery, and they must endure high temperature differentials as the turbine comes up to operational speeds. Depending on placement, conventional turbine bearings must also be protected from higher working temperatures and pressures. This necessitates additional complex components within the turbomachinery as seal pressure lines are run within compressors and turbine rotors to pressurize bearings. The same is true with oil lines that must weave through turbomachinery to keep bearings properly lubricated. The intricacies of these additional components add fabrication cost and maintenance complexity to a conventional turbine.

Conventional turbine assemblies affix rotor blades to the rotor structure—both in the compressors and turbines—using various attachment methods. Examples include pinned roots, dovetail, or fir-tree. As will be described later, these attachment methods, while allowing for ease of single blade replacement, present problems themselves. Integrally bladed disk rotor designs forge blades together with the entire rotor assembly. The lack of attachment elements makes the rotor assemblies lighter and stronger, and also reduces failure points worrisome in high speed rotating machinery. But integrally bladed rotor assemblies come with their own drawbacks as well, apart from being more expensive to produce. Because integrally bladed rotors are of a singular structure, they are more difficult to access within a turbine assembly, inspect, and repair or replace.

In general, maintenance of a conventional turbine engine is divided into two groups of activities or actions. One group of actions can be accomplished with an engine installed in the field while the second, and more complex, group of actions can only be completed with the engine uninstalled and returned to a special overhaul shop or maintenance facility. The following actions or activities can be conducted in the field: turbine engine rotor balancing, compressor blade replacements, turbine module replacement, combustor fuel nozzle replacement, combustor module replacement, and instrumentation replacement. These field repairs usually can be accomplished within 1 to 7 days. The following, more complex maintenance activities typically require disassembly and repair at a specialized facility. These maintenance actions include maintenance and repairs to the: bearing systems, rotor shafts, compressor rotors and blades, combustor system and fuel nozzles, turbine nozzles, turbine rotor and blades, engine casings and mounting systems. These more complex maintenance actions can be accomplished within 30 to 90 days.

The present invention of a compact axial turbine for very dense working fluids is configured for a small diameter and short length turbine and includes features that allow easy assembly and most if not all repair and maintenance actions to be conducted in the field. This arrangement and features also allows maintenance actions to be completed within a single day. Turbine 118 is configured to operate with supercritical working fluids having low critical temperatures, such as between 15 degrees Celsius and 150 degrees Celsius. In one embodiment, turbine 118 is configured to operate with supercritical working fluids having critical temperatures in a range of 30 to 50 degrees Celsius. In another embodiment, turbine 118 is configured to operate with supercritical working fluids having critical temperatures below 200 degrees Celsius. Examples of working fluids of this nature include, but are not limited to, carbon dioxide, nitrous oxide, sulfur hexafluoride, ammonia, xenon, sulfur dioxide, hydrocarbons, and hydrofluorocarbons. It is understood in the art that the critical temperature of a substance is the maximum temperature at which liquid and vapor phases coexist in equilibrium. According to one embodiment, turbine 118 is configured to operate with working fluids having densities at the turbine inlet of 100 kg/m3 or greater. According to one embodiment, turbine 118 is configured to operate with working fluids having critical pressures greater than 3 MPa. It is understood in the art that the critical pressure of a substance is the pressure required to liquefy a gas at its critical temperature. A preferred working fluid for turbine 118 is supercritical carbon dioxide. One of ordinary skill in the art of turbine design would understand the term "configured to operate" as used herein to refer to a device that is reasonably designed to use, and/or seeks to maximize the change in enthalpy of, a working fluid as stated.

Figure 5:
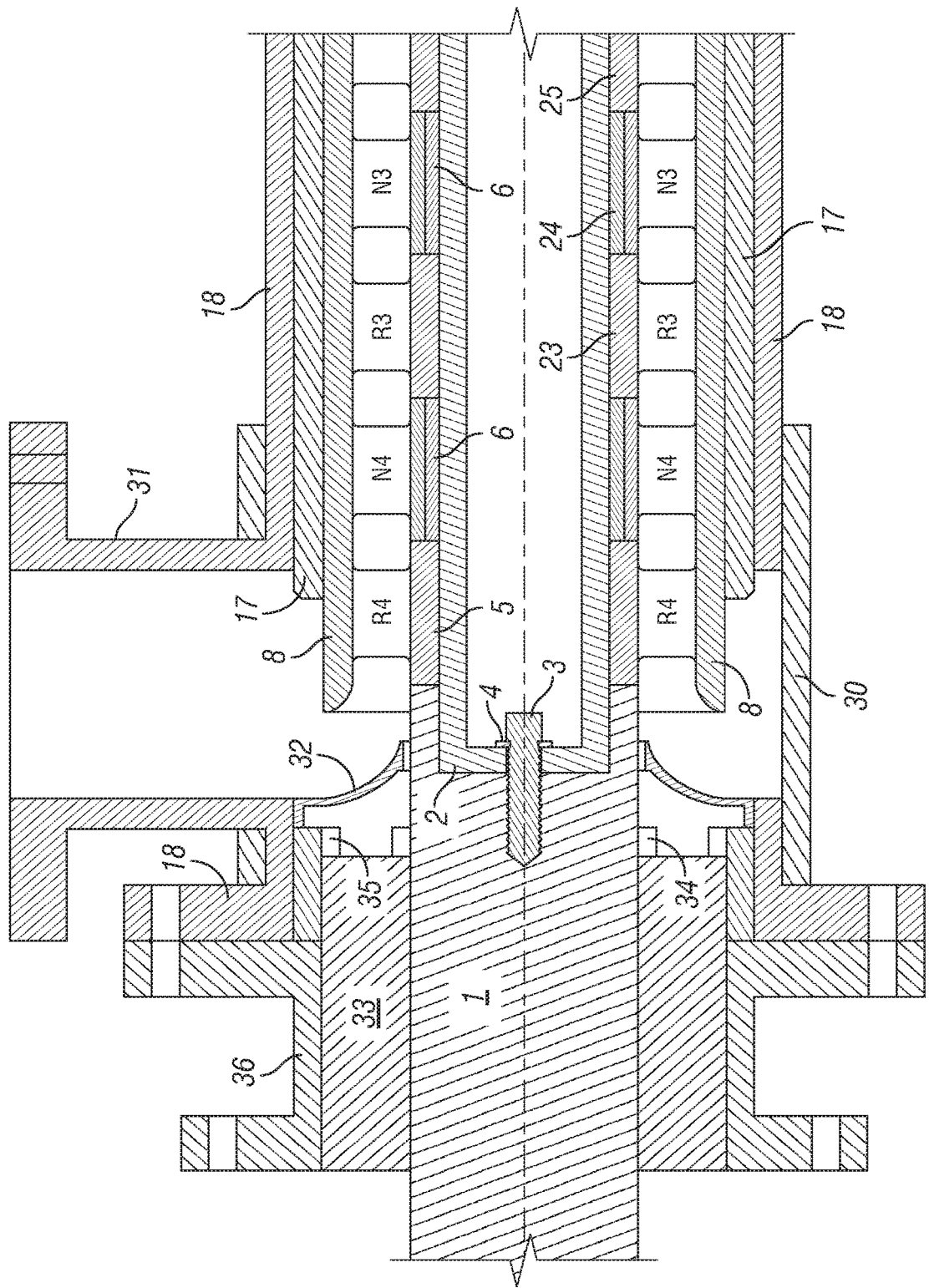
FIG. 5: Cross section view of the compact axial turbine drive end that illustrates the outer and inner casing arrangement and the shaft seal assembly.
Figure 6:
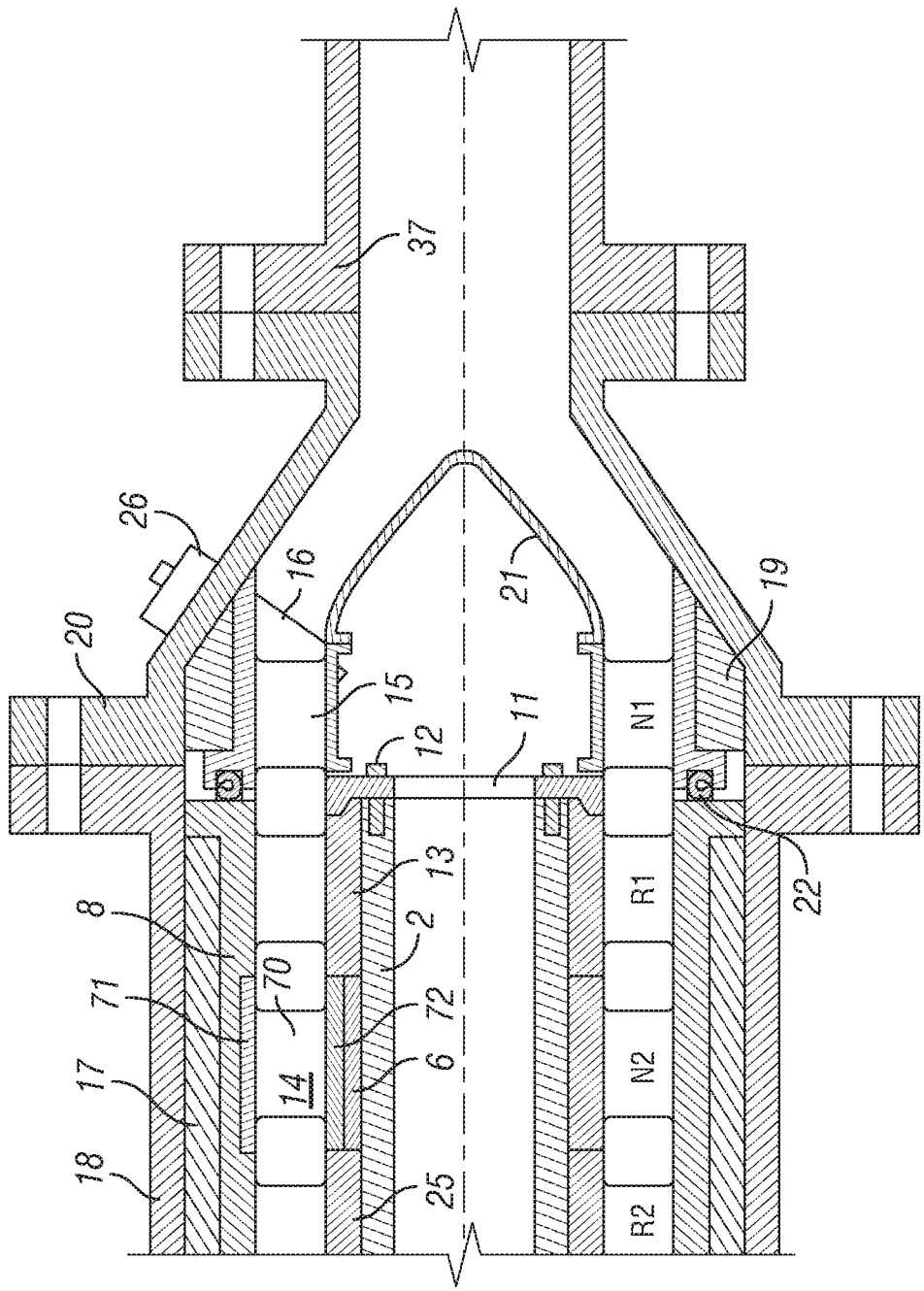
FIG. 6: Cross section view of the compact axial turbine non-drive end that illustrates the outer and inner casing arrangement, forward compression seal, turbine inlet with remote vibration sensor mounting arrangement.

As illustrated in FIG. 5 and FIG. 6, the turbine 118 includes a multi-stage rotor structure consisting of turbine integrally bladed rotors 13, 25, 23 and 5 separated by nozzle spacers 6. The turbine rotors and nozzle spacers are slid onto a torque carrier tube 2. The turbine rotors and nozzle spacers are held in place axially by the pinion gear shaft 1 and the forward locking flange 11.

FIGS. 5 and 6 illustrate turbine 118, an exemplary embodiment according to the aspects of the present disclosure. FIG. 6 represents the forward, or non-drive, end of said exemplary embodiment. Turbine 118 replaces a conventional axial turbine rotor structure (such as the one shown in FIG. 13) that uses two or more bearings located at the shaft ends to provide lateral and rotor thrust load supports, with a nozzle/rotor combination having no secondary bearing(s) on the inlet side. Working fluid enters turbine 118 through working fluid inlet pipe 37, which is secured to inlet casing 20 of turbine 118. Passing over inner bullet nose 21, fluid encounters first nozzle 15, which directs flow into forward integrally bladed rotor 13 (considered in this exemplary embodiment to be stage-1). Pressurized flow of the working fluid impacts forward integrally bladed rotor 13 causing rotation of torque carrier tube 2. Working fluid then encounters mid nozzle segment 14, again directing working fluid flow for interaction with subsequent rotor 25 (stage-2). As will be described later, mid-nozzle segment 14 remains rotationally independent of torque carrier tube 2. Working fluid continues axially through turbine 118, where it progresses from nozzle segment to rotor segment, each time imparting rotational force on torque carrier tube 2. FIG. 5 represents the aft, or drive end, and shows an exemplary embodiment of a continuation of said nozzle/rotor setup. One of ordinary skill in the art would understand that the number of nozzle/rotor segments may be increased or decreased according to the pressure, temperature, and rotational speed design parameters of the preferred embodiment, among other factors.

As will be appreciated by one of skill in the art, the exemplary embodiment represented in FIGS. 5 and 6 illustrates novel features of the present disclosure, the torque carrier tube, with the sliding attachment, the forward locking flange, and the cantilever design. The compact axial design reduces the number of bearings required in a turbine or, in the cantilevered embodiment presented, removes the need for internal bearings altogether. Conventional turbine shafts are supported along the shaft, internally, by a series of bearings (often four or more) that provide radial support and axial rotor thrust support (see FIG. 13, components 210, 211, 212, 213, and 214). As will be later demonstrated herein, the present disclosure recites a cantilever design having an external bearing 112, which in turn eliminates costly parts, simplifies bearing lubrication and sealing, and allows for easier removal and replacement of parts in the field because disassembly and reassembly of turbine 118 need not disturb bearing 112.

Returning to FIG. 5, working fluid continues through nozzle and rotor segments until it reaches aft integrally bladed rotor 5 (in this embodiment, stage-4), where it exits turbine 118 through discharge pipe 31. Working fluid may then enter other components of an overall system (not shown) such as heat exchangers, compressors, valves, etc. to adjust pressure and temperature of the working fluid before reentry into turbine 118.

The forces imparted on the rotors in turbine 118, by the working fluid, cause the assemblies to rotate, in turn rotating torque carrier tube 2, which is in communication with output shaft 1 for provision of torque. A device for which rotational energy is desired, such as a pump, compressor, gearbox, or generator 108, is rotationally coupled to output shaft 1. FIGS. 2B and 2C provide a cross-section view of torque carrier tube 2 and output shaft 1 (see cross section indication on FIG. 2A) according to one embodiment of the present invention. In this embodiment, torque is transferred between rotating elements by way of torque carrying spine connections. The embodiment shown in FIGS. 2A-C take the form of cog splines. The internal surface of output shaft 1 is formed with cog splines 50 which mesh with complimentary cog splines 51 on an external surface of torque-carrier tube 2, meaning that the splines line up so as to allow torque to be transferred. Torque carrying splines may be cog, gear tooth, curved, crowned, involute, parallel-sided, or other-shaped splines. A portion of torque carrier tube 2 is contained in a recess of output shaft 1, such that the cog splines align which allows torque carrier tube 2 to rotationally communicate with output shaft 1. One of skill in the art would recognize that splines may be disposed in an opposite configuration, with splines 50 on the radially outward surface of output shaft 1 and cog splines 51 on the radially inward surface of torque carrier tube 2. Torque carrier tube 2 and output shaft 1 combine to form a continuous turbine shaft. As defined herein, within the portion of turbine 118 that communicates with working fluid, namely the turbomachinery portion, the shaft is deemed a turbomachinery shaft. Stated another way, turbomachinery shaft refers to the portion of the shaft within the portion of turbine 118 having contact with working fluid, such as nozzles, rotor assemblies, etc.

Generally, conventional rotor blades are affixed within a turbine via elements such as pinned roots, dovetail, or fir-tree. Attachment elements such as these, however, reduce the usable diameter of a turbine, taking up space in the radial direction for the attachment element. They also suffer from thermal and mechanical stress issues and may cause additional friction. It is therefore appreciated that the integrally bladed rotors, such as those disclosed herein, improve the compactness of the turbine by reducing its diameter, eliminating parts, and reducing its weight. As will be explained herein, use of integrally bladed rotors in combination with torque carrier tube 2 in its disclosed design greatly improves the reparability and maintenance of turbine 118.

Figure 11:
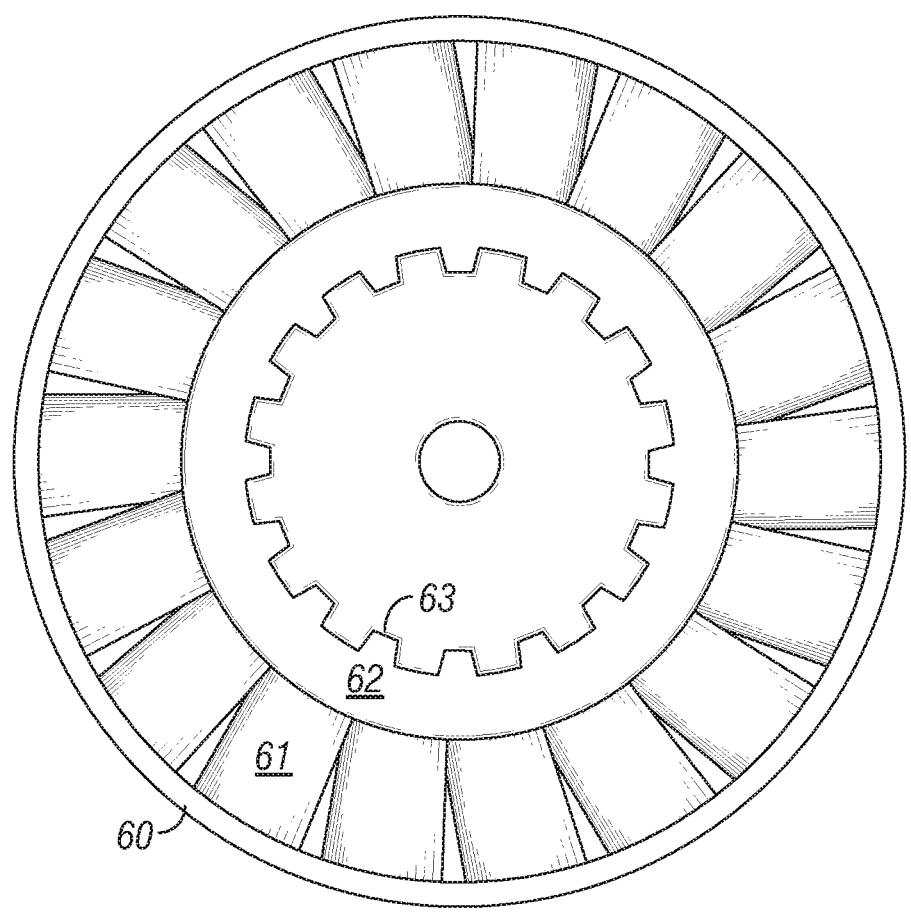
FIG. 11: Illustration of the compact axial turbine showing the detail end view of an integrated turbine rotor, blade, and outer sealing shroud assembly (view looking at the turbine blade leading edges)
Figure 12A:
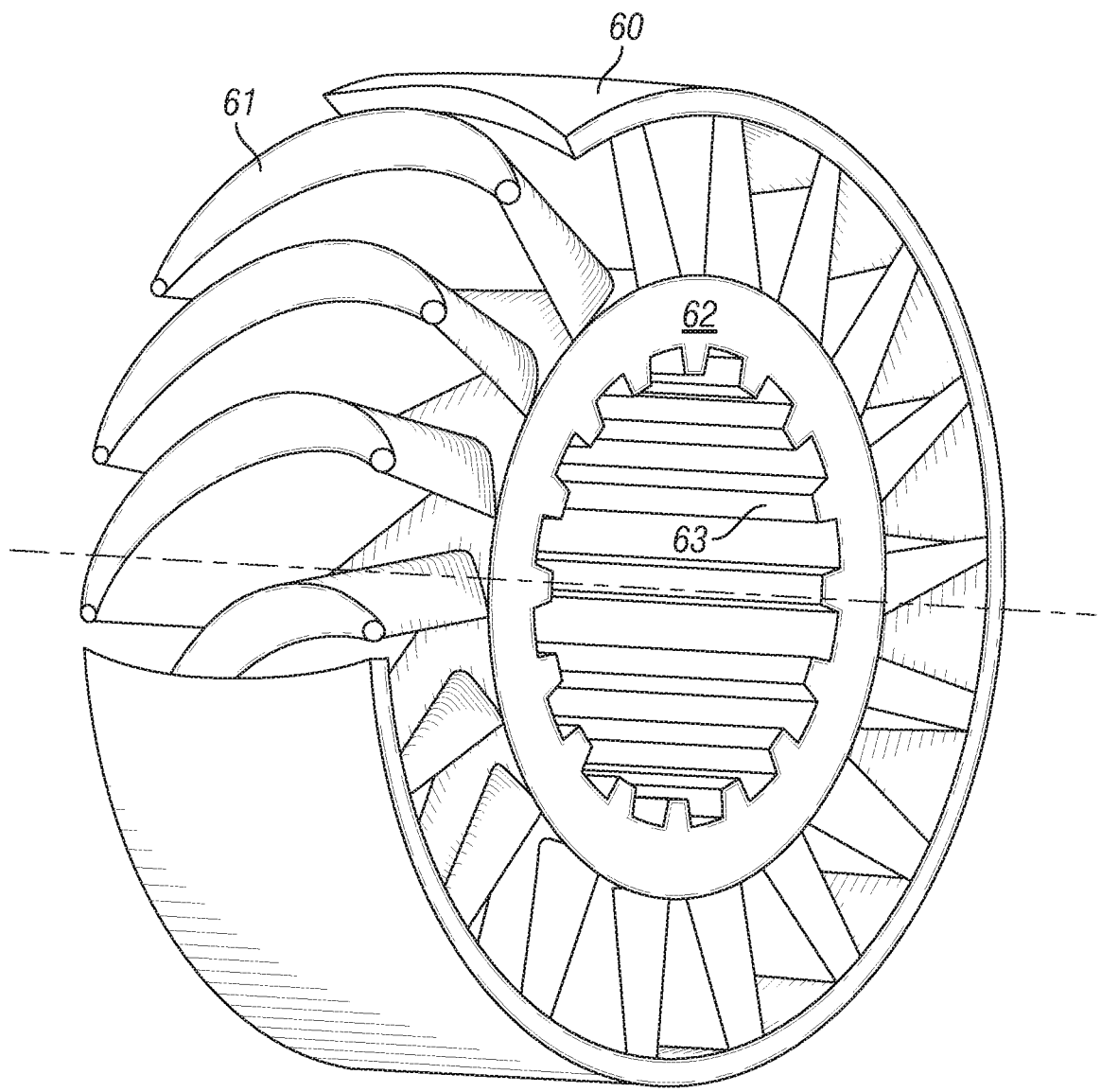
FIG. 12: Illustration of the compact axial turbine showing the isometric view of an integrated turbine rotor, blade, and outer sealing-shroud assembly (partial cutaway of outer shroud—outer seals are not shown for clarity)
Figure 12B:
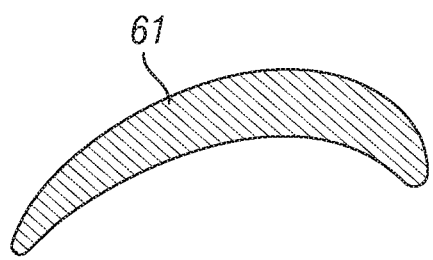

FIGS. 11 and 12 detail an exemplary embodiment of a compact axial turbine of the present disclosure, having an integrated turbine rotor assembly with blade 61, rotor inner annular body 62, rotor body cog spline 63, and outer shroud 60. Forgoing the need for blade attachment elements, such as pinned roots, fir-tree, dovetail, and the like, the integrated nature of this design conveys benefits such as those described above. The embodiment shown in FIGS. 11 and 12 is integrated such that it is fabricated as one piece, and therefore has no attachment elements. Fabrication methods for integrally bladed rotor assemblies include, for example, 3D printing, electrochemical machining, forging, or casting. Other fabrication methods may be used, such as additive manufacturing processes, powder metal hot isometric bonding, brazing, or welding. Being of smaller diameter, disclosed herein in a novel geometrical design for turbine blades and nozzles having a longer relative chord blade, which in turn increases its axial stiffness. The invention described herein also provides for a higher camber blade because no pin root, dovetail, fir-tree or comparable attachment is required. This allows one turbine blade to circumferentially overlap the two adjacent blades (seen partially in FIG. 11). Overlap, in turn, increases the overall efficiency of the turbine. In addition, the blades' higher relative chord length, increased camber, and maximized thickness improve blade bending, torsional stiffness, and eliminate the need for frictional dampening at the outer shroud.

Conventional high-pressure turbine blades (prior art) typically operate in a range of camber angles between 30 and 120 degrees, with the typical maxing out at 120 degrees. In contrast, the blade camber angles for the herein disclosed compact axial turbine 118 ranges from 100 to 150 degrees. In the same vein, conventional high-pressure turbine blades (prior art) generally have a ratio of blade chord length-to-height of around 0.6. In comparison, the blade chord length-to-height for the innovative turbine design disclosed herein allows for ratios much greater, for example, from 2 to 6. In one embodiment the preferred ratio is approximately 3.8 to 4.0. Other ratio ranges include the chord length to turbine diameter ratio where conventional turbines (prior art) range from 0.02 to 0.05, compared with a range of 0.2 to 0.6 for the herein disclosed compact turbine. The turbine blade pitch to chord length ratio for a conventional turbine range from 0.6 to 1.0, compared with a range of 0.2 to 0.7 for the herein disclosed compact turbine.

Outer tip sealing ring, also referred to herein as the rotor shroud 60, makes up the radially outer portion according to one embodiment of the rotor assembly of the present invention. While conventional high-pressure turbines utilize a non-shrouded design to allow for normal thermal expansion of the blades, the compact axial turbine design presented herein allows for a continuous outer shroud 60. This has the benefit of increasing stiffness of the overall rotor assembly, which reduces wear and lowers maintenance costs. FIG. 12 displays an isometric view of an exemplary integrated turbine rotor assembly (with a cutaway in outer shroud 60). Rotor body cog splines 63 make up in the interior facing edge of the rotor assembly, configured to communicate with torque carrier tube cog splines 51 (FIG. 2B). One of skill in the art would appreciate that employment of the cog spline design in the exemplary embodiment provides benefits in fabrication and maintenance, as rotor assemblies may be installed or removed from turbine 118 for maintenance by simply sliding them along the cog splines. This applies to nozzle inner spacers 6 as well (to be described later). Moving radially outward from center, rotor inner annular body 62 connects to blades 61, seen in FIG. 12 as spoked airfoils. Encapsulating blades 61 is rotor shroud 60.

Figure 2A:
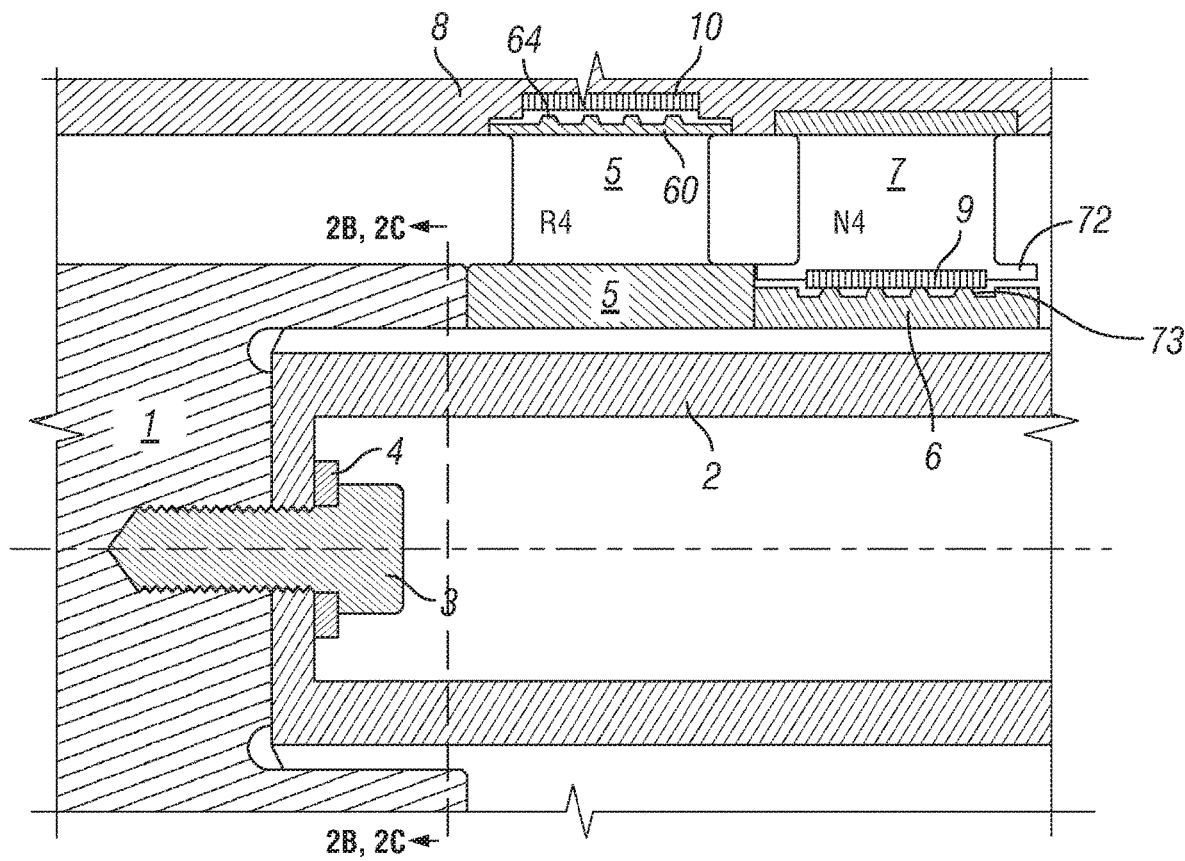
FIG. 2A: Cross section view of the compact axial turbine drive end that illustrates the spline connection of the turbine rotor assembly to the output shaft.
Figure 2B:
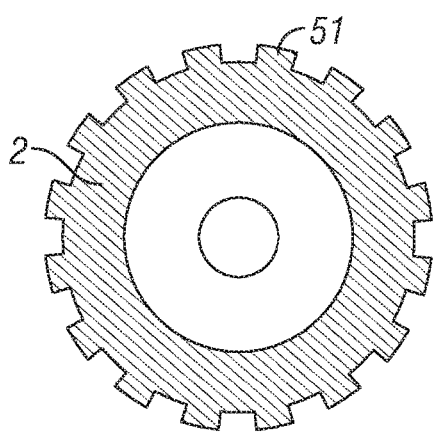
FIG. 2B: Cross section view of the compact axial turbine drive end that illustrates the outside (male) spline cog of the torque carrier tube.
Figure 2C:
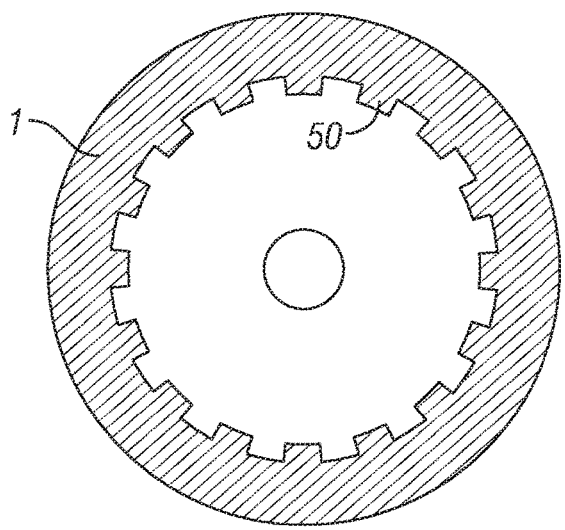
FIG. 2C: Cross section view of the compact axial turbine drive end that illustrates the inside (female) spline cog of the output shaft.

FIG. 2A is a plan view of an exemplary embodiment of compact axial turbine 118 showing aft integrally bladed rotor 5. Rotor shroud 60 appears near the radially outward portion of rotor 13, shown in this figure to include rotor shroud teeth 64, which are configured to contact inner casing seal 10. Seal teeth 64 in combination with inner casing seal 10 minimize flow leakage from the turbine blade pressure to the suction side of blades 61 (labelled in FIG. 12A). This design, having a rotor shroud 60, seal teeth 64, and casing seal 10, has the positive benefit of, for example, better accommodating thermal expansion and provides for reduced tip clearances. Higher tip clearance, common in conventional turbine design, reduces efficiency and increases flow leakage. The configured components of the herein presented design, therefore, improve turbine performance.

Though the exemplary embodiment described above conveys numerous benefits in efficiency and fabrication and maintenance, alternatives may be used. For example, the turbine blade tips may be very near the inner casing or allowed to rub against an inner casing wear surface.

Returning to FIG. 5 and FIG. 6, each integrated rotor assembly is matched with a corresponding nozzle segment, each nozzle segment having spoked airfoil shaped blades designed to funnel working flow toward the rotors. One of skill in the art would recognize that various geometrical shapes may be employed, including for nozzle blades 70, and in nozzle segment width and height. Mid nozzle segment 14 of FIG. 6 is an exemplary embodiment. Unlike the integrated turbine rotor assembly, which is mated to torque carrier tube 2 through cog splines 50, 51 as described above for the purpose of transferring torque, nozzle segment 14 is mated to inner casing 8 and does not rotate. Exemplary nozzle segment 14 consists of a first segmented annular body 71 with spoked airfoil shaped blades 70 extending radially inward from the first annular body (on casing 8 side) to a second segmented annular body 72 (on torque carrier tube 2 side). Segmented annular bodies 71 and 72 are segmented along the axial separation point of inner casing 8, in a preferred embodiment. But they may be further segmented according to attachment and/or maintenance preferences. In one embodiment, nozzle airfoils 70 are integrated into and with inner casing 8. In an alternative embodiment, nozzle airfoils are integrated with a first annular body that is attached to inner casing 8 by way of attachment methods known in the art, such as welding, bolts, or other fasteners.

FIGS. 5 and 6 show a cross section view of the series of nozzle assemblies and rotor assemblies, which repeat for the desired number of stages, from forward integrally bladed rotor 13 to aft integrally bladed rotor 5. The repeating integrally bladed rotors, inner spacers, and nozzles may dimensionally differ. Though maintaining geometries resembling the aft integrally bladed rotor 5, nozzle inner spacer 6, and aft nozzle segment 7 may be preferential, one of skill in the art of turbine design would understand that variations of geometries may be necessary to optimize fluid flow and efficiency. In one embodiment, the compact axial turbine 118 consists of four stages represented by items 5, 6, 7, 13, 14, 23, 24, and 25.

According to the embodiment shown in the figures, exemplary nozzle segment 14 extends inward from casing 8, where second segmented annular body extends to nozzle inner spacer 6. FIG. 2A is informative. Aft nozzle segment 7 is shown with first segmented annular body 71, in this case, inset into casing 8. The inner portion of nozzle segment 7 contains second segmented annular body 72, which extends close to, or makes contact with, nozzle inner spacer 6. Aft nozzle segment 7 is concentric with and encircles nozzle inner spacer 6. Nozzle inner spacer 6, in one embodiment, is a continuous annular body, similar to integrated rotor assembly 5 with an internal surface formed of cog splines which mesh with complementary cog splines of torque carrier tube 2 (see FIG. 12 for reference to the annular body and cog splines of rotor assembly). Nozzle inner spacer 6 has the purpose of reducing working fluid flow leakage while maintaining low friction. One way of accomplishing this, shown in the embodiment of FIG. 2A, is with nozzle inner spacer ribs (teeth) 73 which contact nozzle inner spacer seal 9. Ribs 73 may have various geometries, and may be circumferential in nature. For example, the nozzle spoked airfoil shaped blades 70, that extend radially inward, may not be joined and may be allowed to contact a wear surface on the nozzle spacer ring. Circumferential ribs 73 convey a benefit to the system by reducing fluid flow while lowering friction between nozzle inner spacer 6 and nozzle segment 7.

In one embodiment, nozzle to inner spacer seal 9 extends the entire width of nozzle second segmented annular body 72. In another, shown in FIG. 2A, seal 9 only extends part of annular body 72. It may be contained in a recessed circumferential cavity of annular body 72, or rest on the edge. In another embodiment, seal 9 is contained on or within nozzle inner spacer itself such that the operation of sealing the working fluid is reversed. In one embodiment, the nozzle to inner spacer seal 9 includes hexagonal cavities extending radially inward nozzle inner spacer 6, formed from an abradable material (i.e., honeycomb seal). The radial clearance between seal 9 and nozzle inner spacer is small relative to the dimensions of nozzle segment 7. Other types of seals may be used, such as a labyrinth seal, brush seal, or friction seal. In addition, seal 9 may be solid abradable material.

In the embodiment shown in FIG. 2A, integrally bladed rotor assembly 5 employs a similar mechanism, albeit in communication with inner casing 8, which encircles rotor assembly 5. Rotor shroud 60 of integrally bladed rotor 5, in this embodiment, contains rotor shroud ribs 64 which communicate with inner casing seal 10. This design mirrors the one presented above and conveys similar benefits. Seal 10 may be inset into casing 8 (see FIG. 3A), or it may be placed on the edge. Other seal types may be used, such as a labyrinth seal, brush seal, friction seal, or stepped portion of the inner casing that encloses the integrally bladed rotor shroud.

In the embodiment shown in FIG. 2A, the forward face of aft integrally bladed rotor 5 is in contact with nozzle inner spacer 6. Each segment is slid onto torque carrier tube by way of matching cog splines. A benefit of this design becomes clear. Inspection, maintenance, and repair of rotors 5 and nozzle inner spacers 6 can be easily accomplished by sliding each segment from torque carrier tube 2.

Figure 7:
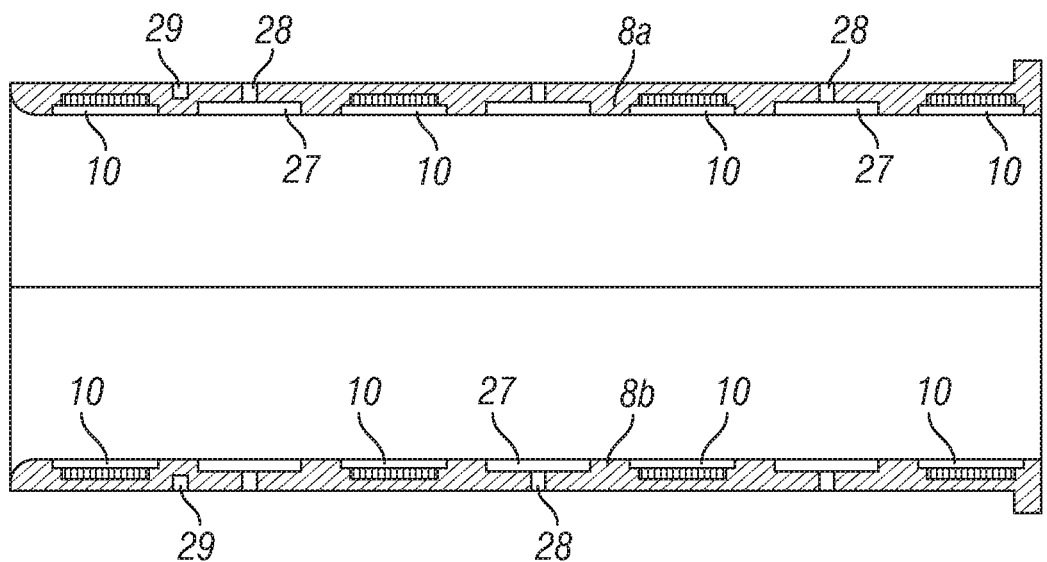
FIG. 7: Cross section view of the compact axial turbine inner casing with horizontal split line arrangement.

FIG. 7 is a cross section view of inner casing 8. According to one embodiment, casing assembly 8 is divided into two pieces with a longitudinal gap separating an upper inner casing 8a from a lower inner casing 8b. In still other embodiments, casing assembly 8 is further divided into additional segments. A series of channels may be formed into the internal surface of upper inner casing 8a and lower inner casing 8b for positioning components of compact turbine 118. For example, one channel may position inner casing seal 10. Other channels may be configured to communicate with rotor assembly 5, such as by housing rotor shroud 60. Still another channel may provide for mounting nozzle segments 7. In one embodiment, nozzle segments 7 are integrated into inner casing 8. In another embodiment, such as the one shown in FIG. 7, nozzle segment mounting channel 27 is configured to receive nozzle first segmented annular body 71 by way of nozzle attachment fasteners 28. Fasteners 28 may take several forms, such as dovetails, bolts, screws, pins, or welding. For embodiments having no first segmented annular body 71, inner casing 8 may be configured to mount nozzle blades 70 directly.

The longitudinal segmentation of inner casing 8 presents a novel feature in turbine design, allowing the two inner casing pieces to be assembled radially around the turbine rotor assembly regardless of the orientation of the turbine during fabrication or maintenance. Comparable high-pressure turbines must be fabricated vertically to minimize rotor shaft misalignment and bending. Longitudinal segmentation also aids in the ease of inspection, maintenance, and repair of compact axial turbine 118, as described above. During maintenance, inner casing 8 is pulled apart along the one (or more, if segmented into multiple parts) segmentation line(s), quickly providing access to internal components such as nozzle segments 7, inner casing seals 10, and the like. At the same time, the removal of inner casing 8 allows integrally bladed rotors 5 and nozzle inner spacers 6 to be inspected and/or slid off torque carrier tube 2, if desired.

Figure 8:
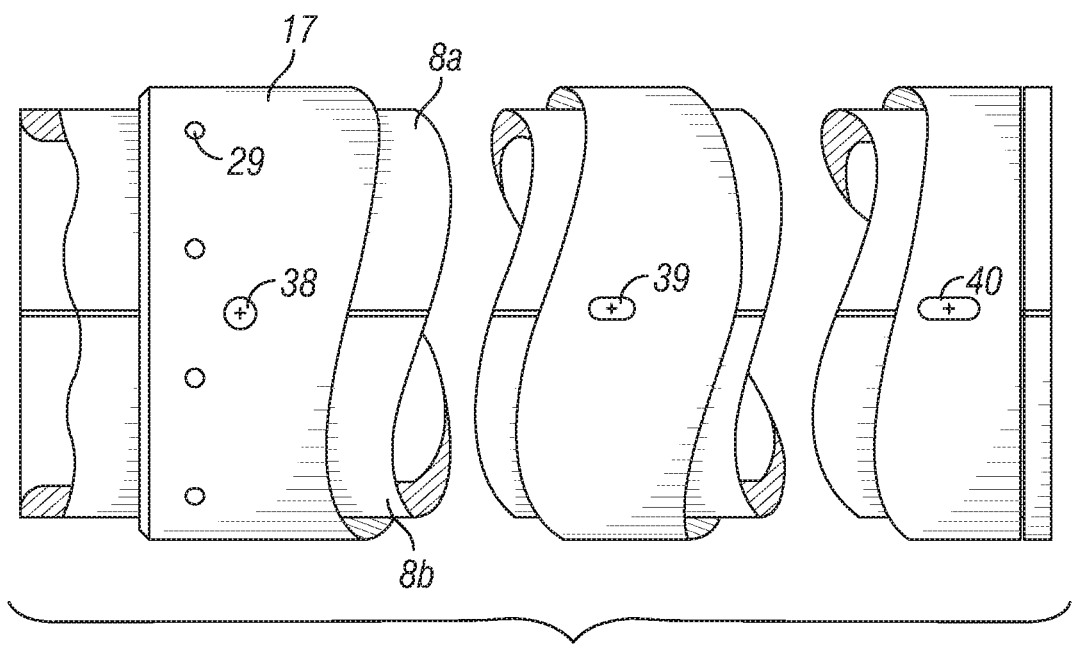
FIG. 8: Illustration of the compact axial turbine innercasing to mid-casing (turbine cartridge sleeve) assembly.

In a preferred embodiment, sections 8a and 8b of inner casing 8, when aligned, are held in place via turbine cartridge sleeve 17, which is designed to encircle inner casing 8 to hold it in place. It also reduces leakage of working fluid and uniformly carries the circumferential stresses. FIG. 8 illustrates attachment of turbine cartridge sleeve 17 to upper inner casing 8a and lower inner casing 8b. For two-segment inner casing embodiments, such as shown in the figure, when both segments are in place, turbine cartridge sleeve 17 is slid over inner casing 8 and then joined to upper inner casing 8a and lower inner casing 8b with an inner casing to turbine cartridge sleeve fastener 29, which may be placed at desired locations according to preference. As seen in the embodiment of FIGS. 7 and 8, fasteners 29 are placed near the drive-end portion in between aft integrally bladed rotor 5 and aft nozzle segment 7. Proximate the aft end of the turbine cartridge sleeve 17 are a pair of aft support pin holes

38. The aft support pin hole 38 may be a partial depth cylindrical dimple in the outer surface of the turbine cartridge sleeve 17. Midway along the length of the turbine cartridge sleeve 17 are a pair of mid support pin slots 39. The mid support pin slot 39 may be a partial depth longitudinal slot in the outer surface of the turbine cartridge sleeve 17. Proximate the forward end of the turbine cartridge sleeve 17 are a pair of forward support pin slots 40. The forward support pin slot 40 may be a partial depth longitudinal slot in the outer surface of the turbine cartridge sleeve 17. Other locations and geometries for the pin slots are contemplated herein. In an alternative embodiment, multiple turbine cartridge sleeves 17 may be employed within a single turbine 118. In the exemplary embodiment shown in FIGS. 5 and 6, turbine cartridge sleeve 17 spans the axial majority of inner casing 8, meaning the majority (greater than 50%) of the axial length of inner casing 8 is encircled by sleeve 17. Sleeve 17 needn't encircle the entire axial length of inner casing 8. One of skill in the art would understand that sleeve 17 bears the load and provides leakage reduction at less than a full axial span. In one embodiment, turbine cartridge sleeve 17 spans at least 70% of the axial length of inner casing 8. In another embodiment, sleeve 17 spans at least 51% of the axial length of inner casing 8.

The foregoing is one method of affixing turbine cartridge sleeve 17 within compact axial turbine 118. It is understood that other fastening means are contemplated herein, such as attaching by way of bolts, pins, welding, or shrink-fit.

FIGS. 5 and 6 illustrate the casing configuration according to one embodiment presented herein. Rotor assemblies 5 and nozzle assemblies 7 (as examples) extend to inner casing 8 (whether in connection or in proximity). Inner casing 8 is encapsulated by turbine cartridge sleeve 17, as described above. Circumferentially outside of turbine cartridge sleeve 17 is outer casing 18. For part of compact axial turbine 118, outer casing 18 serves as the exterior shell, providing connection points to the turbine itself, and to other components of turbine 118, such as inlet casing 20 (see, for example, flange connection points between outer casing 8 and inlet casing 20 in FIG. 6). In one embodiment, outer casing 18 is fabricated to include working fluid discharge pipe 31. In other embodiments of the present invention, outer casing 18 may be attached to discharge pipe 31 through attachment means, such as a flange. Where discharge pipe meets the aft tubular portion of compact axial turbine 118 inner fluid flow area, an axial gap may be presented to allow more volume for working fluid to slow down and channel to discharge pipe 31. In the alternative, outer casing 18 may be extended to meet with shaft seal casing 36. The working fluid must leave the system. Where an additional axial gap is used, outer casing doubler sleeve 30 may be employed to cover said axial gap. Doubler sleeve 30 effectively seals the working fluid into axial turbine 118 so that exit flow path ring 32 can direct the working fluid out of the turbine 118. One of ordinary skill in the art would understand that multiple discharge pipes 31 may be employed. No exit flow path ring 32 is necessary, but it helps direct the fluid flow.

Figure 9:
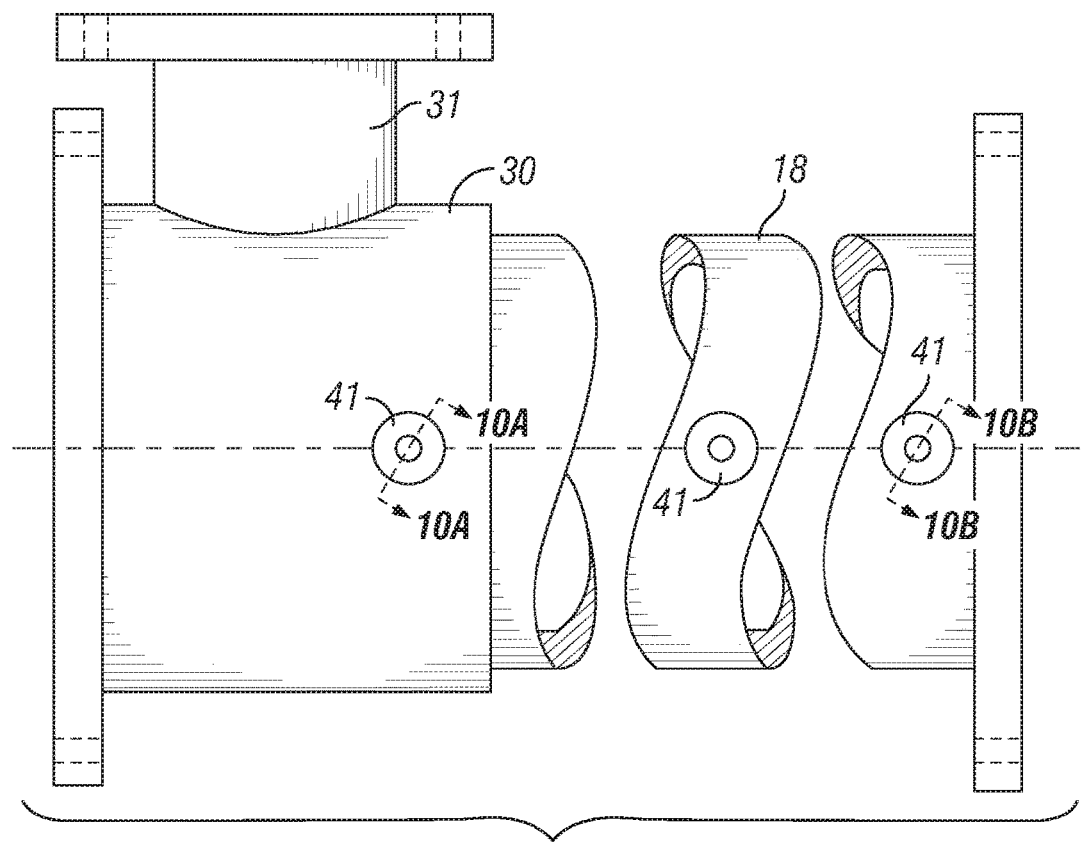
FIG. 9: Illustration of the compact axial turbine outer-casing arrangement showing the turbine cartridge support pin locations.

Continuing with one embodiment of the present invention, FIG. 9 illustrates the outer casing 18. A pair of casing support pins 41 penetrate outer casing 18 at three axial stations aligned with aft support pin hole 38, mid support pin slots 39, and forward support pin slots 40 (detailed in FIG. 8). Discharge pipe 31 is shown with outer casing doubler sleeve 30 over it.

Figure 10A:
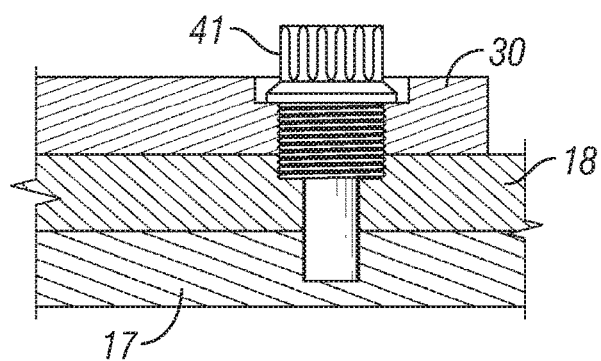
FIG. 10: Cross section views of the compact axial turbine cartridge support pins to outer casing assembly (section views A-A and B-B from FIG. 9)
Figure 10B:
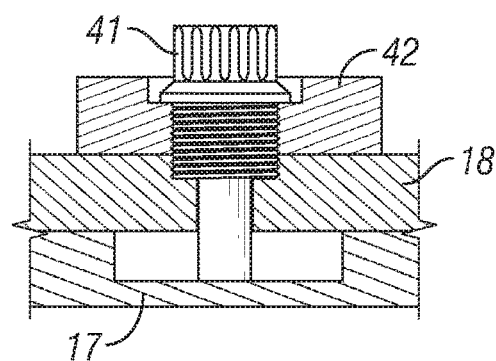

FIG. 10 provides cross section views (section views A-A and B-B from FIG. 9) of one method of assembly of turbine cartridge sleeve 17 to outer casing 18. In section view A-A, turbine cartridge sleeve 17 is attached to outer casing 18 by the casing support pin 41. A support pin boss is formed by outer casing 18 and outer casing doubler sleeve 30. In one embodiment, doubler sleeve 30 is welded to outer casing 18. Section view B-B illustrates the mid and forward support locations. At these locations, turbine cartridge sleeve 17 is mated with outer casing 18 by way of casing support pin 41, which extend into divots in turbine cartridge sleeve 17. A support pin boss is formed by the outer casing 18 and the outer casing boss 42.

The use of turbine cartridge sleeve 17 reduces the number of parts within compact axial turbine 118. It also simplifies servicing of the turbine. More importantly, it lowers the thermal and mechanical stresses that plague conventional turbines. Bolted flange joints, for example, introduce stress concentrations into the casing, cause uneven thermal growth, require many bolts and nuts to seal the casing halves, and leak working fluid out of the primary flow path. A bolted flange joint also requires special machining operations that are more expensive. Bolts, clips, and other fastening devices expand at different rates and extent than the components they hold. As such, this thermal expansion differential imparts additional stresses on individual components and the overall device as a whole, which can cause premature wear and maintenance needs. Fasteners and fastener points complicate fabrication as well, as fastening points are more difficult to line up. The turbine cartridge sleeve, by contrast, solves the aforementioned problems by presenting a singular fastener-free surface to the majority of the compact axial turbine 118 inner casing 8.

However, a person of skill in the art of turbine design would understand that other methods of fastening layers of casing may be employed. Types of fasteners and fastening methods include bolting, pinning, strapping, or welding.

A novel feature of the herein disclosed invention should be clear to a person of skill in the art of turbine design, in view of the above-referenced description. Contained within turbine cartridge sleeve 17 are the majority of the working components of turbine 118, referred to herein as a turbine cartridge. For example, in the embodiment presented herein as preferred, the turbine cartridge comprises the turbomachinery, torque carrier tube 2, and cartridge sleeve 17. This allows for the quick removal and replacement of the turbine cartridge as a single component, as will be explained in more detail below. Inspection of FIGS. 2A, 5, and 6, along with the descriptions contained herein, provide insight to one skilled in the art of turbine design as to which turbine 118 components are contained within the turbine cartridge.

FIG. 6 illustrates the forward, or non-drive end, of an exemplary embodiment of compact axial turbine 118. Working fluid enters turbine 118 through working fluid inlet pipe 37 where it encounters inner bullet nose 21, which directs fluid flow to inlet nozzle 15 (stage 1 in the shown embodiment). Inner bullet nose 21 may be integrated with nozzle 15, or it may be joined. According to the embodiment shown, inlet bullet nose connects via flange to corresponding flange or rim of inlet nozzle 15 by, for example, welding or by fasteners.

As should be apparent to one of skill in the art of turbine design, the inlet section of turbine 118 is intended to be removed for access to the turbine cartridge, according to this embodiment. As such, the forward section of the turbine cartridge is separated from inlet nozzle 15 by an axial gap. Inlet nozzle 15 consists of a first continuous annular body (i.e., rim) with spoked airfoil shaped blades extending radially inward from the rim to a second annular body (i.e., shroud) which projects forward of the rim and mates with inner bullet nose 21. Because the inner portion of the inlet section of turbine 118 does not rotate in this embodiment, no nozzle inner spacer is required for inlet nozzle 15. To prevent working fluid leakage, a forward compression seal 22 may be employed. In the shown embodiment, an aft facing circumferential groove is presented in inlet nozzle 15 to contain forward compression seal 22. Forward compression seal 22 contacts and is enclosed by inlet nozzle 15 and inner casing 8. It should be clear that forward compression seal 22 may take other shapes or be placed at other locations between the inlet section and main body section of turbine 118.

As seen in FIG. 6, inlet casing 20 has both a forward and aft flange. The forward flange of the inlet casing 20 is connected to a working fluid inlet pipe 37. The aft flange of the inlet casing 20 is connected to a forward flange of outer casing assembly 18. Outer casing assembly 18 has both a forward and aft flange and, as was described earlier, encloses turbine cartridge sleeve 17 and inner casing 8.

Figure 3A:
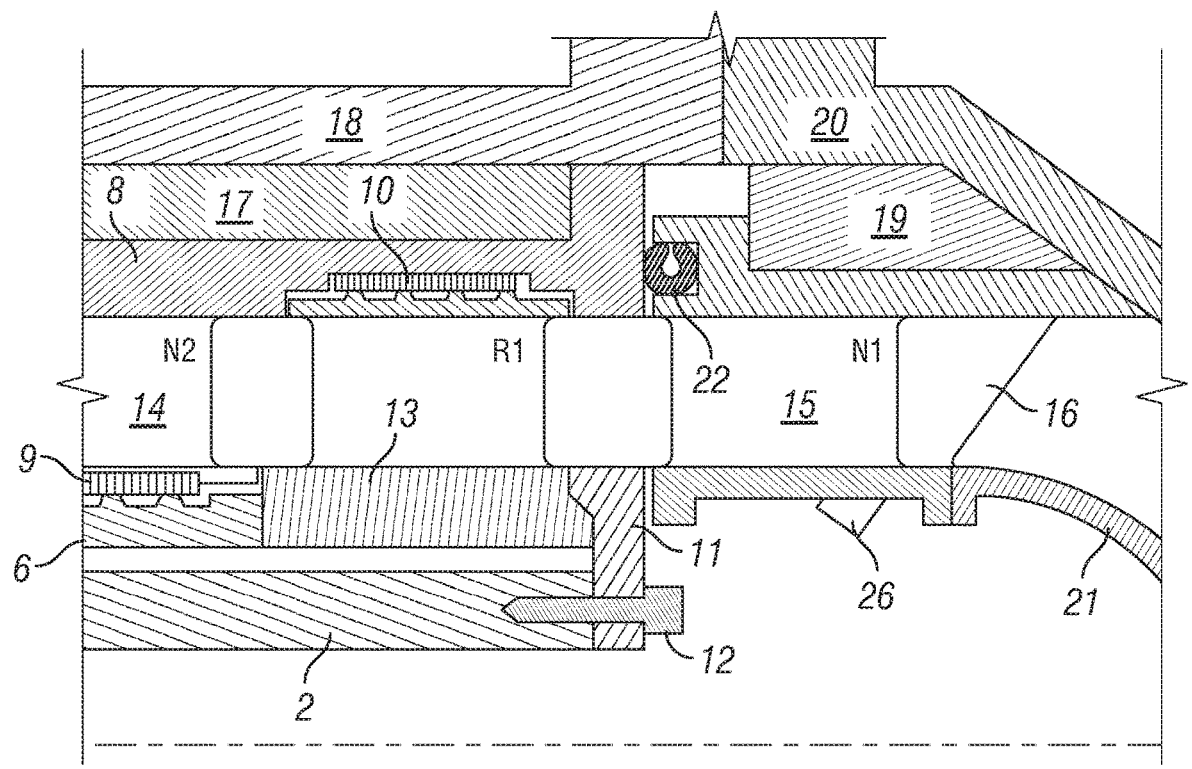
FIG. 3A: Cross section view of the compact axial turbine non-drive end that illustrates the spline coupling of the turbine rotor assembly to the torque carrier tube and forward compression seal arrangement.

FIG. 3A illustrates a close-up is a cross section view of the compact axial turbine non-drive end, as presented in the exemplary embodiment. An inlet nozzle mounting block 19 is wedged between a portion of inlet nozzle 15 and the inlet casing 20. Because mounting block 19 can be more precisely machined than inlet pipe case 20, it assists in fitting inlet components and lowers fabrication costs.

FIG. 3A also shows forward integrally bladed rotor 13 according to the presented embodiment described above. Forward integrally bladed rotor 13 may differ from other integrally bladed rotors (such as aft rotor 5) in that a forward portion of forward integrally bladed rotor 13 is chamfered. The forward integrally bladed rotor 13 chamfer mates with a congruent chamfer on a forward restraining flange 11. Forward restraining flange 11 is fastened to torque-carrier tube 2 by forward restraining flange bolts 12 and an anti-rotation washer (not shown). According to one embodiment, no forward bearing exists within turbine 118, meaning the turbomachinery shaft is cantilevered Another way to describe this embodiment is that the rotor assemblies and nozzle spacers encircle the turbomachinery shaft in a cantilevered portion of the shaft, which in the embodiment shown in FIGS. 5 and 6 is torque carrier tube 2. No bearings exist on the non-drive (forward) end of the rotor assemblies and nozzle spacers. In one embodiment, an axial majority (greater than half in the axial direction) of the turbomachinery shaft is cantilevered. This cantilevered design presents numerous benefits as described above. Forward restraining flange 11 holds rotor assemblies and nozzle spacers in place, but it additionally allows for balancing of the rotating portion. In one embodiment, a series of receptacles (such as holes) are present in the forward restraining flange 11 for attachment of balance weights 44 (not shown in FIG. 3A). Likewise, vibration sensor targets may be formed on a forward surface of forward restraining flange 11 for sensing, calibrating, and balancing purposes. For balancing weights 44, other attachment means are contemplated. For example, balance weights 44 could be clipped, pinned, glued, screwed, or welded. Though forward restraining flange 11, in the shown embodiment, is presented at the distal end of torque carrier tube 2, other embodiments may place restraining flange away from the distal end, for example on the drive end side of forward integrally bladed rotor 13 or nozzle 14.

Conventional turbine engine assemblies have shafts and rotors that are balanced. For the conventional turbine engine assembly, balancing is accomplished in a six-step process. First, all shafts and rotors components are balanced as individual pieces during piece-part manufacturing. In step two, the shaft and rotor mating flange faces are measured for flatness. In the mating of the flanges, high spots are aligned with low spots so that the assembled rotor and shaft is as straight as possible. Step three requires that the blades in each compressor and turbine stage are weighed and then installed on the rotor to evenly distribute the weight around the circumference of the rotor. In step four, the shaft and rotors are balanced as sub-assemblies during the assembly process. Step five is where the entire turbine assembly's balance is checked and corrected, if needed, during the fabrication acceptance test at the factory. Finally, in step six, the turbine assembly's balance is checked again and corrected, if needed, in the field after it is attached to the drive equipment. As should be appreciated by one of skill in the art, the novel design disclosed herein eliminates need for steps two, three, and four, thereby saving time, effort, and cost.

Figure 4A:
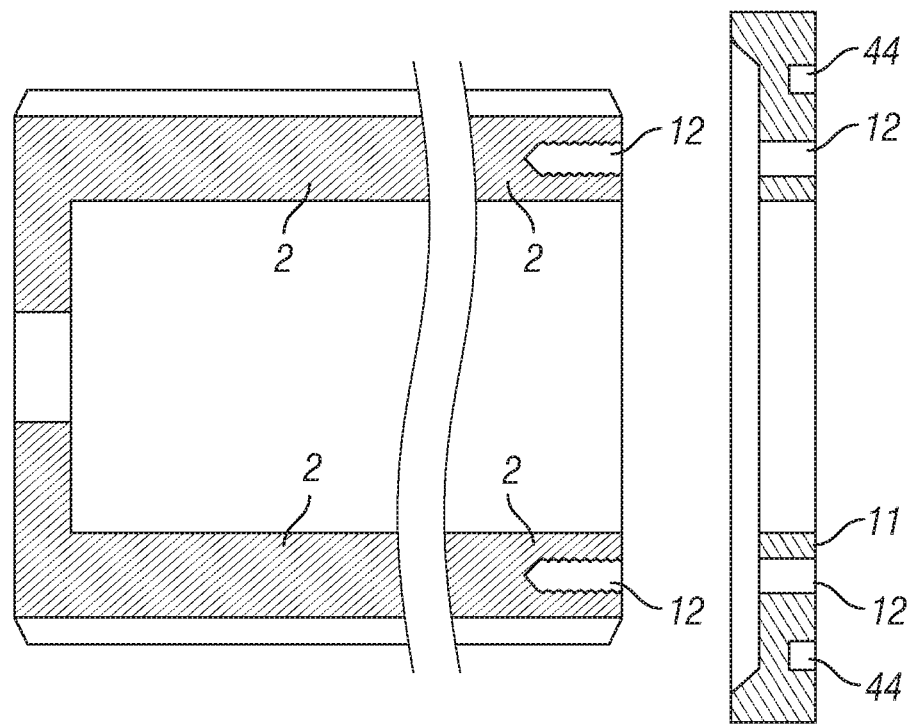
FIG. 4A: Detailed cross section views of the splined torque-carrier tube and forward and locking flange.
Figure 4B:
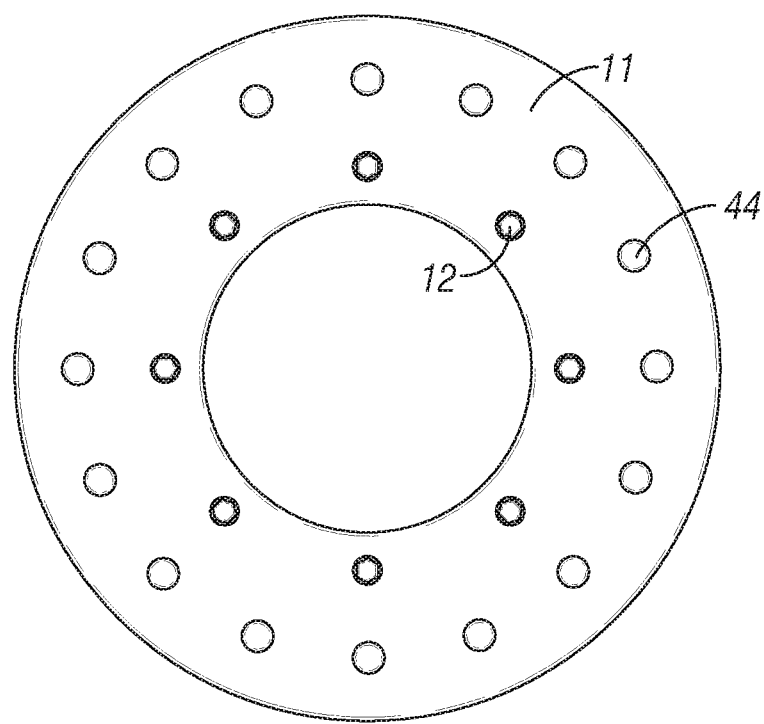
FIG. 4B: Front view of the forward and locking flange showing the flange bolt and balance weight locations.

FIG. 4A is a detailed cross section view of torque carrier tube 2 and forward restraining flange 11, according to the exemplary embodiment. Forward restraining flange 11 may be attached to torque carrier tube 2 through various attachment means. FIG. 4A shows attachment by way of forward restraining flange bolts 12. Also shown in FIG. 4A are details of the forward restraining flange 11 such as aft facing chamfer which mates with forward integrally bladed rotor 13 and holes through which forward restraining flange bolts 12 protrude (detailed in FIG. 3A). FIG. 4B is a plan view of forward restraining flange 11 showing a possible configuration of flange holes and balance weight locations. According to the present design, forward restraining flange 11 may contain a central hole for access to the inside surface of torque-carrier tube 2 or it may be solid with no holes other than forward restraining flange bolts 12 and holes or recesses for mounting balancing weights 44.

Figure 3B:
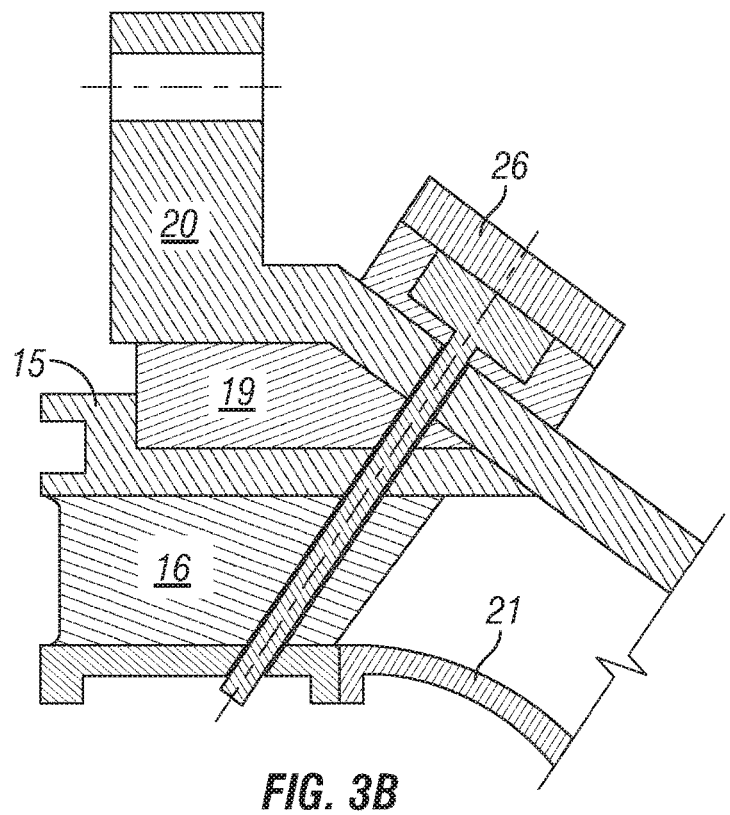
FIG. 3B: Cross section view of the compact axial turbine non-drive end that illustrates the turbine remote vibration sensor mounting arrangement.

To assist with balanced operation of the mechanism, turbine 118 may include one or more vibration sensing devices. One example may be a vibration probe 26 as shown in FIGS. 3A and 6 and better represented in FIG. 3B. Vibration probe 26 is mounted to a surface of inlet casing 20 so that it has internal passage through inlet casing 20. Depending on the geometry and configuration of the inlet components, vibration probe 26 may also pass through mounting block 19 and the inlet nozzle 15. In this case, according to one embodiment, a special inlet nozzle 16 is interposed between the blades of inlet nozzle 15, and encloses an internal passage through which vibration probe 26 extends from the outer surface of inlet casing 20 toward the forward restraining flange 11. In one embodiment, the vibration probe 26 is an optical vibration sensor. Other types of vibration probes may be used, such as proximity-probes or an accelerometer type vibration sensors.

Turning to the aft, or drive end, of turbine 118, FIG. 5 shows an exemplary embodiment of the present invention. A portion of torque carrier tube 2 is contained in a recess of output shaft 1, allowing complementary cog splines 50 and 51 to transmit torque. Torque carrier tube 2 may be fastened to output shaft 1 by a torque carrier tube to output shaft attachment bolt 3. The embodiment shown includes anti-rotation washer 4 to prevent relative motion of the attachment components. Because of the relatively short axial length of compact axial turbine 118, bolt 3 may be accessed by a simple modified torque wrench. This feature dramatically simplifies removal of the turbine cartridge for inspection, maintenance, or repair. Other attachment means for torque carrier tube 2 to output shaft 1 are contemplated, such as multiple bolts, clips, pins, and equivalents.

The novel turbine cartridge design herein disclosed allows for easy removal and replacement of turbine working parts, including while in the field. To remove the turbine cartridge, the inlet section 20 (FIG. 3A) is removed. Torque carrier tube bolt 3 is removed, as are centering alignment bolts 41 (FIGS. 8, 9 and 10). Then the turbine cartridge is slid out of outer casing 18.

An aft integrally bladed rotor 5 is mounted on torque carrier tube 2 (see FIGS. 5 and 2A). Because both rotor 5 and output shaft 1 are in rotational communication with torque carrier tube 2, a face of the aft integrally bladed rotor 5 and the output shaft 1 may be in contact. FIG. 5 shows an example structure of the aft end of turbine 118. The aft flange of outer casing assembly 18 is fastened to a shaft seal casing 36 having both a fore and aft flange with a tubular body interposed between the fore and the aft flange. A shaft seal assembly 33 is inserted into the shaft seal casing 36 and mates with both a shaft seal inner stop ring 34 mounted to the output shaft 1 and a shaft seal outer stop ring 35 mounted to the shaft seal casing 36. A conical surface of an exit flow-path ring 32 is aligned with an internal surface of the discharge pipe and flange 31. An internal surface of the exit flow-path ring 32 is proximate to the circumference of output shaft 1. An external surface of the exit flow-path ring 32 mates with the outer casing 18. As described earlier, discharge pipe and flange 31 protrude through the outer casing doubler sleeve 30 and joins to both the tubular portion and aft flange of the outer casing assembly 18.

It is understood that shaft seal assembly 33 serves to seal output shaft 1 from working fluid and that said assembly 33 may take forms known in the art, such as a dry gas seal or labyrinth type seal.

It can be appreciated from the above description of the invention that compact axial turbine 118 needs no internal bearings, which improves performance. It also reduces the number of moving parts under high temp and pressure. For example, no oil line or seal pressure line is required to be provided within the working fluid compartment of the turbine. It also allows complete disassembly and reassembly of the turbine without disturbing the bearing(s) or any gearbox thereto attached. This design marks a significant improvement over the conventional state of the art.

By positioning turbine bearings outside the working fluid compartment, the turbine can also be serviced or replaced outright without impacting bearing placement or alignment. Furthermore, bearings need not be temperature or pressure hardened for use inside a turbine, which increases longevity and decreases cost.

Conventional waste heat recovery power generation systems employing axial turbines connected to the pinion shaft of a gearbox orient the inlet of the axial turbine on the side of the gearbox. These configurations have a large turbine inlet volute casing mounted to the gearbox casing structure. The inlet volute is needed to quickly turn the inlet flow from a radial to an axial direction. This arrangement allows the turbine to be removed from the casing without removing the inlet volute. However, this type of arrangement presents problems because of the temperature gradients and stresses between the turbine inlet and the gearbox casing. For example, additional cooling and insulation is needed for thermal protection of the gearbox bearings and seals, special structure or additional support is necessary to carry the thermal stress loads, additional gearbox structure is needed to carry the weight of the turbine inlet volute, a large flanged connection is needed at the turbine exit to facilitate installation and removal of the turbine components.

The present invention described herein, resolves these issues by orienting the inlet of the axial turbine away from the gearbox. In this orientation the cooler and lower pressure working fluid exiting the axial turbine is toward the gearbox. As a result, the gearbox bearings and seals require less thermal protection, the thermal stress loads are reduced, and a lighter radial pipe exhaust duct is used in place of a heavier inlet volute. This orientation locates the axial turbine torque carrier tube-to-pinion shaft connection in the cooler exhaust portion of the turbine, and it provides axial flow into the axial turbine inlet. In addition, this orientation, along with the compact axial turbine cartridge design, allows the turbine cartridge to be removed more easily through the forward flange that is smaller in diameter than the aft flange.

One of skill in the art would also appreciate that employment of the cog spline 50, 51 design in the exemplary embodiment provides benefits in fabrication, maintenance, inspection, and repair, as rotor assemblies 5 and nozzle inner spacer assemblies 6 may be installed or removed from turbine 118 for maintenance by simply sliding them along the cog splines. Alternate attachment schemes include rabbeted-flange, bolted-flange, curvic-spline flange, or tie-rods.

The self-contained cartridge design of the turbine cartridge allows for quick replacement of turbine 118 working parts, or if desired, inspection and maintenance can be performed quickly and in the field, relying on only a few bolts for access. The modularity of the herein disclosed invention conveys numerous benefits in both cost and ease of maintenance. By employing a split-line two-piece inner casing nozzle assembly, the process of assembling turbine 118 may be conducted in both horizontal and vertical assembly fixture/jig positions. Generally speaking, conventional turbines are assembled vertically because the high-pressure turbine casing is not split. Nozzle segments and turbine rotor segments must be stacked sequentially from smaller to larger diameters; the stacking is done vertically to minimize rotor shaft misalignment and bending. Employment of the cog spline 51 torque carrier tube 2 and corresponding matching cog spline nozzle and rotor assemblies eliminates costly and problematic parts that are prone to failure in a conventional turbine, such as bolted flanges, tie-rods, or special coupling nuts. Construction and assembly are thereby simplified because the number of parts and fasteners are reduced. Compact axial turbine's 118 small size allows integrated disk-blade-outer-ring-seal assemblies not possible in conventional size turbines, which eliminates fasteners and retainers normally used between the disk and blade attachment. The nozzle spacer rings are identical, further simplifying the design and reducing the number of parts. Conventional turbines, being of larger diameter, require nozzles segments of varying geometries, which further complicates their design. Compact axial turbine 118 small diameter, according to one embodiment, allows for high efficiency using some or all rotor and/or nozzle assemblies of uniform geometry. This reduces complexity in fabrication and also eases repair, as technicians need carry fewer replacement parts.

High pressure, temperature, and density of super critical working fluid applies radial forces on the inner casing of turbines. Turbine cartridge sleeve 17 of the present invention carries these loads more effectively because it presents a uniform cylinder. This cylindrical shape also reduces stress concentrations that could be experienced with split-flange casings. Turbine cartridge sleeve 17 also eliminates the many bolts and retainers that are required with conventional split-flange casing. Cartridge sleeve 17 provides a complete cylindrical seal along the length of the inner casing 8. This reduces leakage that might occur along a typical casing split line flange joint.

According to the presently disclosed design, certain features reduce issues with thermal growth seen in turbine use. For example, bolting features along the length of outer casing 18 and turbine cartridge sleeve 17 provide centering and alignment of the turbine to outer casing 18 and allow for differences in thermal growth by way of axial slots. Outer casing 18 and turbine cartridge sleeve 17 have centering holes that provide correct turbine position relative to the gearbox.

Compact axial turbine 118, as presented herein, is designed to use very dense supercritical working fluid. It includes features to reduce the turbine diameter, and thus the turbine flow area. These design features include the torque carrier tube, the turbine cartridge arrangement, and the integrated turbine blisk. Conventional blade-to-disk attachment features require a much larger disk diameter (about 3× larger). As an example, turbine 118 may employ a diameter of 10 inches and be 24 inches in length, while a comparable conventional turbine that produces similar power would necessarily be 30 inches in diameter and 50 to 60 inches long. In one embodiment, turbine 118 has a diameter in the range of 10 inches to 22 inches and length of 24 inches to 54 inches. In another embodiment, turbine 118 has a diameter in the range of 19 inches to 22 inches and a length in the range of 48 inches to 54 inches. Reference to the diameter of turbine 118 refers to the general diameter of the tubular portion containing the turbomachinery of the turbine 118. Extraneous items such as flanges and the discharge pipe are understood to be excluded from the diameter calculation as discussed or claimed herein. Another way to characterize the compactness of turbine 118 is through the inner diameter of outer casing 18. At its largest radial point, for example, the inner diameter of outer casing 18 is less than 12 inches in one embodiment; and in another, it is 24 inches or less.

This invention describes a compact axial turbine 118 that can deliver net power output in the range from 10 megawatts to 50 megawatts. The term net power is the actual power delivered, for example, for consumer use. In one example, that use would be the electrical grid. The term "compact axial turbine," as used herein is a descriptor that may be quantified by comparing the power density, or power output per unit volume, of the turbine. A more compact turbine will have a greater power density. The power density for the compact axial turbine of the invention disclosed herein is one that is greater than 2 kilowatts per cubic inch. In one embodiment, the compact axial turbine generates 10 megawatts of electrical power at approximately 5.3 kilowatts per cubic inch. A conventional turbine of similar power has a power density of approximately 0.5 kilowatts per cubic inch. In comparison, the compact axial turbine of the present invention, has a power density over 10 times greater than a conventional turbine. In another embodiment, the compact axial turbine generates 50 megawatts of electrical power at approximately 2.4 kilowatts per cubic inch.

The invention disclosed herein makes use of geometries not available to conventional turbines of other design. For example, significant efficiency boosts are achieved through increased camber that the long chord blade allows. This is possible, in part, because the outer-seal-ring 60 (or outer shroud) prevents flow leakage from the turbine blade pressure side to suction side. This minimizes performance losses.

While exemplary or preferred embodiments of the inventions disclosed herein have been presented, it is understood that alternatives may be considered including in the following conditions or configurations.

Compact axial turbine 18 may be connected to output shaft 1 by a rabbeted flange, or a bolted flange, or tie-rods, or curvic-spline, or special coupling nut connection. Turbine blades 61 and shrouds 60 may be separate items which are not integral and are attached with fasteners, deformable rivets, or hook-and-slot mechanisms. Integrally bladed rotor shrouds 60 may be segmented with each blade have an attached shroud segment or with banks of blades 61 sharing a segment of shroud 60. Blades 61 may be unshrouded, with blade tips allowed to rub against a tip seal section carried in inner casing assembly 8. Upper inner casing 8*a* and lower inner casing 8*b* may be joined together by a horizontal bolted flange arrangement. Upper inner casing 8*a* and lower inner casing 8*b* may be joined together by a series of bands. The bands may be slipped or bolted around the inner casing assembly 8. Nozzle vane segments may be welded to inner casing assembly 8.

Inner casing assembly 8 and turbine cartridge sleeve 17 may be combined as a single component. In this alternative embodiment, the rotor blade tip seal and the nozzle-vane segments are individual ring elements that slide into the inner casing. The shaft seal casing 36 and outer casing 18 may be combined as a single assembly.

Inner casing assembly 8 or turbine cartridge sleeve 17 may be centered and held to turbine outer casing 18 by pads welded to the inner surface of the outer casing 18. Inner casing assembly 8 or turbine cartridge sleeve 17 may be centered and held axially to turbine outer casing 18 by a tab-pin connection that is internal to the outer casing 18. For example, in this alternate design, tabs are welded to the turbine cartridge sleeve, the tabs containing a slot. Small pins are welded to the inside surface of the outer casing. The turbine cartridge is inserted axially into the outer casing and then rotated so that the pins and tab slots engage. An external bolt-pin then passes through the outer casing and engages the turbine cartridge sleeve and prevents rotation and axial movement. Integrally bladed rotor shrouds may be smooth on the external surface with ribs formed on the internal surface of the inner casing assembly 8 to reduce flow of working fluid. In this embodiment, seal 10 may be inlayed into the rotor assembly itself, with teeth 64 being part of inner casing 8. A complementary solution for the nozzle segments is also contemplated. Either seal may comprise one or more of the following: honeycomb seal, labyrinth seal, brush seal, or friction seal, or may be of solid abradable material.

As the nozzle segments turn the working fluid, a circumferential force or torque is imparted the nozzle segments. This torque may be transmitted from the nozzle segments to inner casing assembly 8 by welding, brazing, pins, bolts, or by steps on the circumference of the nozzle segment that mate with a steps on the inner surface of the inner casing assembly 8. This is an alternate method of holding the nozzle segments to the inner casing by using an interlocking step or key.

A summary of the operation of a preferred embodiment of the herein-disclosed invention is provided. Working fluid enters compact axial turbine 118 through working fluid inlet pipe 37 and is guided by inner bullet nose 21 and inlet casing 20 toward inlet nozzle 15. The airfoils 70 of the inlet nozzle 15 accelerate the flow of the working fluid, changing both the magnitude and direction of the working fluid velocity. The working fluid then passes over forward integrally bladed rotor 13 which further accelerates the flow, changing its direction. This acceleration of the working fluid flow creates a force on forward integrally bladed rotor 13, causing it to rotate. The rotational force (torque) applied to forward integrally bladed rotor 13 is transmitted to torque-carrier tube 2 through the meshing of the cog splines 63 on forward integrally bladed rotor 13 and those 51 on torque-carrier tube 2. The working fluid continues to pass pairs of nozzles and integrally bladed rotors with the nozzles applying a torque to inner casing assembly 8 through nozzle attachment fastener 28 and the integrally bladed rotors applying a torque in the opposite direction to torque-carrier tube 2 until the working fluid exits aft integrally bladed rotor 5. After exiting aft integrally bladed rotor 5, the working fluid is guided toward discharge pipe and flange 31 by the exit flow-path ring 32. As the working fluid passes over the nozzles and integrally bladed rotors of the compact axial turbine, the temperature, pressure, and enthalpy of the working fluid are reduced such that the temperature, pressure, and enthalpy at the exit of aft integrally bladed rotor 5 are less than at the inlet to inlet nozzle 15.

Torque carrier tube 2 transmits torque from integrally bladed rotors to output shaft 1 through the meshing of the cog splines 51 on the torque-carrier tube 2 and those 50 on output shaft 1. Torque carrier tube 2 also aligns the integrally bladed rotors 5, 13, 23, and 25. Shaft seal assembly 33 reduces working fluid leakage while permitting shaft rotation of output shaft 1. Bearing 112 aligns torque carrier tube 2 and integrally bladed rotors 5, 13, 23, and 25 within inner casing assembly 8 and transmits radial and axial loads from output shaft 1 to the structural supports.

Vibration probe 26 measures vibration of torque carrier tube 2, integrally bladed rotors 5, 13, 23, and 25, and forward restraining flange 11 relative to the inlet casing 20. Forward compression seal 22 reduces working fluid flow between inner casing assembly 8 and inlet nozzle 15, while permitting the inner casing assembly 8 to move axially relative to inlet nozzle 15. Nozzle to inner spacer seal 9 reduces flow of working fluid between the nozzles and nozzle inner spacer 6. Inner casing seal 10 reduces flow of working fluid between the integrally bladed rotor shrouds and the inner casing assembly 8.

Torque from inner casing assembly 8 is transmitted through the turbine cartridge sleeve fastener 29 to turbine cartridge sleeve 17 and then through casing support pins 41 to outer casing 18. The flange of the outer casing 18 is mounted to a structural support which resists rotation.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A compact axial turbine comprising:
   two or more rotor assemblies comprising a plurality of torque carrying splines;
   a turbomachinery shaft comprising an output shaft and a torque carrier tube;
   wherein the output shaft comprises a plurality of torque carrying splines, wherein torque carrier tube comprises a plurality of torque carrying splines, and wherein at least a portion of the torque carrying splines of the output shaft are meshed with at least a portion of the torque carrying splines of the torque carrier tube; and
   wherein at least a portion of the torque carrying splines of the torque carrier tube are meshed with the torque carrying splines of the two or more rotor assemblies.

2. The turbine of claim 1, wherein an axial majority of the turbomachinery shaft is cantilevered.

3. A compact axial turbine comprising:
   two or more rotor assemblies comprising a plurality of torque carrying splines;
   a turbomachinery shaft, wherein the turbomachinery shaft comprises a plurality of torque carrying splines configured to mesh with the torque carrying splines of the two or more rotor assemblies;
   a nozzle spacer;
   wherein the nozzle spacer comprises a plurality of torque carrying splines configured to mesh with the torque carrying splines of the turbomachinery shaft.

4. The turbine of claim 1, further comprising:
   an outer casing having and inner and outer diameter;
   wherein the inner diameter of the outer casing at its largest part is 14 inches or less.

5. The turbine of claim 1, wherein the two or more rotor assemblies comprise integrally bladed rotors.

6. The turbine of claim 1, wherein:
   the plurality of torque carrying splines of the output shaft include torque carrying splines disposed on a radially inward or outward surface of the output shaft;
   the plurality of torque carrying splines of the torque carrier tube include torque carrying splines disposed on a radially inward or outward surface of the torque carrier tube;
   wherein the at least a portion of torque carrying splines of the output shaft are meshed with the at least a portion of the torque carrying splines of the torque carrier tube, such that torque is conveyable between the output shaft and the torque carrier tube.

7. The turbine of claim 1, wherein the torque carrier tube is axially bolted to the output shaft.

8. The turbine of claim 1, wherein the turbine is configured to operate with working fluid having critical temperatures between 15 degrees Celsius and 150 degrees Celsius.

9. The turbine of claim 1, wherein the turbine is configured to operate with working fluid that is supercritical carbon dioxide.

10. A compact axial turbine comprising:
   turbomachinery disposed in an inner casing, wherein the inner casing is separable along a longitudinal axis of the turbine into two or more segments;
   a turbine cartridge sleeve surrounding an axial majority of said inner casing, wherein said turbine cartridge sleeve holds together the two or more segments of the inner casing; and
   a torque carrier tube, wherein an axial majority of said torque carrier tube is cantilevered.

11. The turbine of claim 10, further comprising:
an output shaft, wherein said cantilevered torque carrier tube is bolted to the output shaft with a single bolt.

12. The turbine of claim 10, further comprising:
a rotor assembly, wherein the rotor assembly comprises 5 integrally bladed rotors.

13. The turbine of claim 10, wherein the turbine is configured to operate with working fluid having critical temperatures between 15 degrees Celsius and 150 degrees Celsius.

14. The turbine of claim 10, wherein the turbine is configured to operate with working fluid that is supercritical carbon dioxide.

15. The turbine of claim 10, further comprising:
an outer casing having and inner and outer diameter, wherein the inner diameter of the outer casing at its largest part is 18 inches or less.

16. The turbine of claim 10, further comprising:
a flange attached to the torque carrier tube, wherein the flange comprises a plurality of balance weight attachment receptacles.

17. The turbine of claim 16, further comprising:
a vibration sensor.

18. The turbine of claim 11, further comprising:
a rotor assembly, wherein the rotor assembly is axially restrained by the output shaft.

19. The turbine of claim 1, wherein an axial majority of said torque carrier tube is cantilevered.

20. The turbine of claim 3, wherein the nozzle spacer is positioned on the turbomachinery shaft between two of the two or more rotor assemblies.

* * * * *